US008266034B1

(12) United States Patent
Butcher, III

(10) Patent No.: US 8,266,034 B1
(45) Date of Patent: Sep. 11, 2012

(54) METHOD, SOFTWARE PROGRAM, AND SYSTEM FOR MANAGING DEBT

(75) Inventor: George H. Butcher, III, New Rochelle, NY (US)

(73) Assignee: Goldman, Sachs & Co., New York, NY (US)

( * ) Notice: Subject to any disclaimer, the term of this patent is extended or adjusted under 35 U.S.C. 154(b) by 0 days.

(21) Appl. No.: 12/119,227

(22) Filed: May 12, 2008

Related U.S. Application Data

(63) Continuation of application No. 09/896,630, filed on Jun. 29, 2001, now Pat. No. 7,373,328, which is a continuation-in-part of application No. 09/723,692, filed on Nov. 28, 2000, now abandoned.

(51) Int. Cl.
*G06Q 40/00* (2012.01)
(52) U.S. Cl. ............ 705/36 R; 705/35; 705/36; 705/38; 705/39
(58) Field of Classification Search ............... 705/35–38; 702/35–38
See application file for complete search history.

(56) References Cited

U.S. PATENT DOCUMENTS

| | | | |
|---|---|---|---|
| 4,739,478 A * | 4/1988 | Roberts et al. | 705/36 R |
| 5,508,731 A | 4/1996 | Kohorn | |
| 5,689,649 A | 11/1997 | Altman et al. | |
| 5,704,045 A | 12/1997 | King et al. | |
| 5,742,775 A * | 4/1998 | King | 705/38 |
| 5,799,287 A | 8/1998 | Dembo | |
| 5,857,176 A | 1/1999 | Ginsberg | |
| 5,875,437 A | 2/1999 | Atkins | |
| 5,930,762 A | 7/1999 | Masch | |
| 5,966,700 A | 10/1999 | Gould et al. | |
| 5,987,436 A | 11/1999 | Halbrook | |
| 6,021,397 A * | 2/2000 | Jones et al. | 705/36 R |
| 6,026,364 A | 2/2000 | Whitworth | |
| 6,026,388 A | 2/2000 | Liddy | |
| 6,070,151 A | 5/2000 | Frankel | |

(Continued)

OTHER PUBLICATIONS

Managing debt: how to get the best deal Fox, Mike. Canadian Machinery and Metalworking. Toronto: Sep./Oct. 1999. vol. 94, Iss. 7; p. 15.*

(Continued)

*Primary Examiner* — Alexander Kalinowski
*Assistant Examiner* — Clement B Graham
(74) *Attorney, Agent, or Firm* — Perkins Coie LLP

(57) ABSTRACT

In one embodiment, a method for managing variable rate debt in the form of at least one credit issued by a borrower, comprising: budgeting for interest owed on the variable rate debt by the borrower during a time period when an interest rate on the variable rate debt is below a first predetermined low interest rate level; applying at least a portion of any existing current budgetary excess by the borrower to reduce future interest rate risk by performing at least one of i) the early retirement of principal associated with the variable rate debt and ii) the funding of a sinking fund; and applying at least a portion of any accumulated budgetary excess by the borrower during a time period when the interest rate is above a first predetermined high interest rate level to reduce an amount of debt service. A corresponding software program and system are also disclosed.

15 Claims, 27 Drawing Sheets

U.S. PATENT DOCUMENTS

| | | | |
|---|---|---|---|
| 6,105,007 | A | 8/2000 | Norris |
| 6,148,293 | A | 11/2000 | King |
| 6,233,566 | B1 | 5/2001 | Levine et al. |
| 6,236,973 | B1 | 5/2001 | Dillard |
| 6,321,212 | B1 | 11/2001 | Lange |
| 6,338,047 | B1 | 1/2002 | Wallman |
| 2001/0042785 | A1* | 11/2001 | Walker et al. ............... 235/379 |
| 2002/0019793 | A1 | 2/2002 | Frattalone |
| 2002/0161681 | A1* | 10/2002 | Richman et al. ............... 705/36 |
| 2002/0194124 | A1* | 12/2002 | Hobbs et al. ............... 705/39 |
| 2004/0117302 | A1* | 6/2004 | Weichert et al. ............... 705/40 |

OTHER PUBLICATIONS

Managing debt: how to get the best deal Fox, Mike. Canadian Machinery and Metalworking. Toronto: Sep/Oct 1999. vol. 94, Iss. 7; p. 15.*

Shop around for best rates: Consumers may find good deals at own institutions Joice M, Rosenberg. Charleston Daily Mail. Charleston, w.v: May 15, 2000.p. 3D.

Innovative uses for municipal investment contracts Smith, Scott D. Topics in Health Care Financing. Gaithersburg: Winter 1994, vol. 21, Iss. 2, p. 45 (6 pp.).

* cited by examiner

Fixed rate tax-exempt bonds bear a higher interest rate initially than tax-exempt VRDBs and, in general, also cost more over the life of the issue. In exchange for the higher costs of fixed rate bonds, the issuer eliminates potential future budgetary risk related to interest rate volatility and tax risk.

Budgetary volatility can be significantly reduced by budgeting for debt service an amount between the actual VRDB debt service and the fixed rate debt service and using the excess to fund an interest rate reserve or reduce principal. Here a reserve is funded and drawn upon when rates are high to maintain the issuer's payment at the budgeted amount.

Again, an interest rate reserve is funded by budgeting a higher than actual amount for debt service. The interest reserve is used when rates are high to prevent debt service from exceeding the fixed rate debt service. Until required, the reserve economically defeases an equal amount of bonds.

Again, interest is budgeted at a higher than actual rate. The excess is used to retire principal early. If rates rise above the budgeted rate, principal is re-amortized at the higher rate to reduce the annual budget impact. The budgeted amount can be framed as a legally mandated sinking fund requirement.

The next several charts compare the impact of a higher rate environment on plain vanilla VRDBs and under the three alternative approaches.

Impact of higher rates on VRDBs where a reserve is funded while rates are low by budgeting an amount for debt service that exceeds the actual bond debt service. The reserve is used when rates rise to fund any excess over the budgeted amount. In this scenario budgeted debt service is maintained for an additional four years after rates rise.

Impact of higher rates on VRDBs where a reserve is funded while rates are low by budgeting an amount for debt service that exceeds the actual bond debt service. The reserve is used when rates rise to fund any excess over what fixed rate debt service would have been. In this scenario the fixed rate debt service is maintained for an additional six years after rates rise.

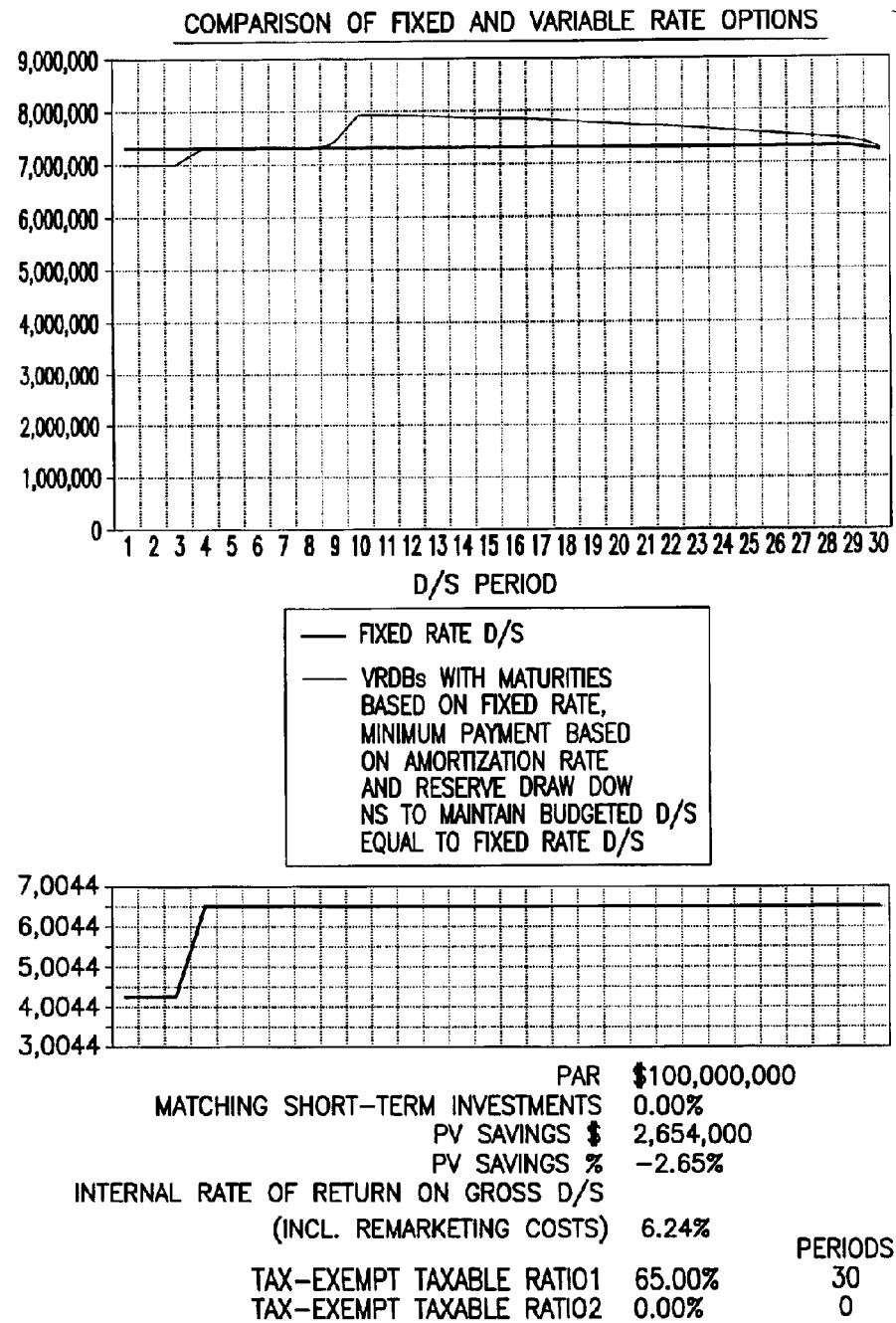

FIG.4G

Impact of higher rates on VRDBs where higher than actual debt service is budgeted while rates are low and is used to retire principal early. Here debt service immediately exceeds the fixed rate amount when rates rise but the impact of higher rates on the annual debt service requirement is reduced due to the early retirement of principal when rates are low and re-amortization of principal when rates rise.

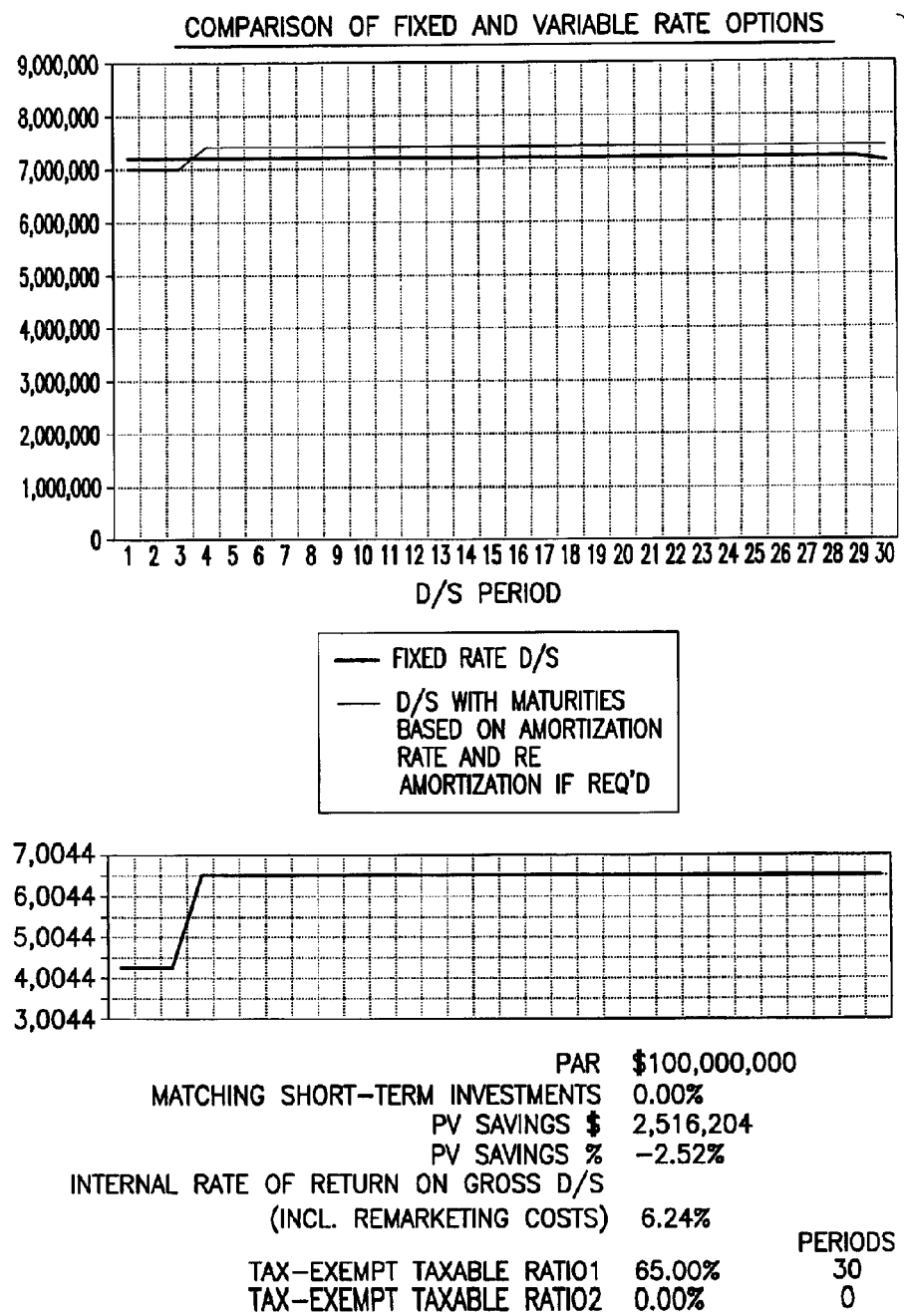

FIG.4H

The relative impact of higher rates given each of the four VRDB structuring approaches is illustrated below. Each of the three structuring alternatives to plain vanilla VRDBs significantly mitigates the budgetary risk.

FIG. 4I-2

| PV SAVINGS (LOSS) | PERIOD | INTEREST RATE EXCLUDING REMARKETING COSTS | CORPUS INVESTMENT RATE |
|---|---|---|---|
| N/A | 1 | 4.25% | 0.00% |
|  | 2 | 4.25% | 0.00% |
|  | 3 | 4.25% | 0.00% |
| (2,617,204) | 4 | 6.50% | 0.00% |
| −2.62% | 5 | 6.50% | 0.00% |
|  | 6 | 6.50% | 0.00% |
|  | 7 | 6.50% | 0.00% |
| (2,665,687) | 8 | 6.50% | 0.00% |
| −2.67% | 9 | 6.50% | 0.00% |
|  | 10 | 6.50% | 0.00% |
|  | 11 | 6.50% | 0.00% |
|  | 12 | 6.50% | 0.00% |
|  | 13 | 6.50% | 0.00% |
|  | 14 | 6.50% | 0.00% |
|  | 15 | 6.50% | 0.00% |
|  | 16 | 6.50% | 0.00% |
| (2,654,000) | 17 | 6.50% | 0.00% |
| −2.65% | 18 | 6.50% | 0.00% |
|  | 19 | 6.50% | 0.00% |
|  | 20 | 6.50% | 0.00% |
|  | 21 | 6.50% | 0.00% |
|  | 22 | 6.50% | 0.00% |
|  | 23 | 6.50% | 0.00% |
| (2,516,284) | 24 | 6.50% | 0.00% |
| −2.52% | 25 | 6.50% | 0.00% |
|  | 26 | 6.50% | 0.00% |
|  | 27 | 6.50% | 0.00% |
|  | 28 | 6.50% | 0.00% |
|  | 29 | 6.50% | 0.00% |
|  | 30 | 6.50% | 0.00% |

PAR $100,000,000
AMORTIZATION RATE 5.70%
FIXED RATE 6.00%
MATCHING SHORT-TERM INVESTMENTS 0.00%
REMARKETING COSTS 0.30%
INTERNAL RATE OF RETURN ON GROSS D/S 6.24%
([NO] REMARKETING COSTS) 5
CORPUS EARNINGS 3
RESERVE EARNINGS
LEVEL DEBT SERVICE

CORPUS AND RESERVE EARNINGS

1ST FIXED RATE ARBITRAGE YIELD
2ND FIXED RT ARB YID PLUS RECOVERABLE COSTS
3RD PERIODIC RATES
4TH PERIODIC RATES PLUS RECOVERABLE COSTS
5TH TAXABLE PERIODIC RATE

| | | PERIODS |
|---|---|---|
| TAX-EXEMPT TAXABLE RATIO1 | 65.00% | 30 |
| TAX-EXEMPT TAXABLE RATIO2 | 0.00% | 0 |

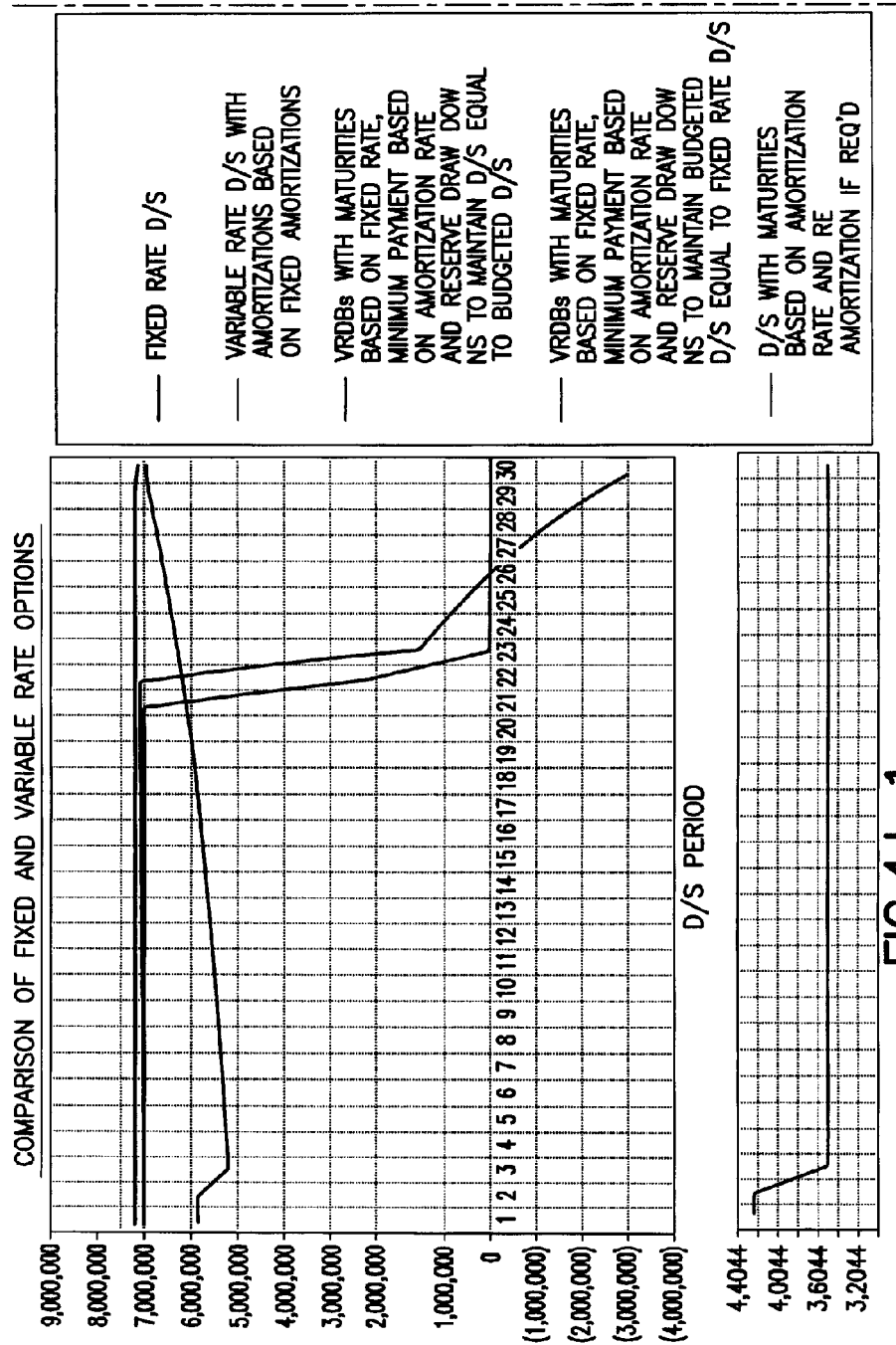

Unless short-term rates increase significantly in the future, the use of any of the three approaches involving a higher budget requirement for debt service will result in significant savings and in early retirement of the bonds. The expected reduction in the average life of an issuer's debt should be a credit positive for the rating agencies.

FIG.4J-2

| | |
|---|---|
| PAR | $100,000,000 |
| AMORTIZATION RATE | 5.70% |
| FIXED RATE | 6.00% |
| MATCHING SHORT-TERM INVESTMENTS | 0.00% |
| REMARKETING COSTS | 0.30% |
| INTERNAL RATE OF RETURN ON GROSS D/S ([NO] REMARKETING COSTS) | 3.91% |
| CORPUS EARNINGS | 5 |
| RESERVE EARNINGS | 3 |
| LEVEL DEBT SERVICE | |

CORPUS AND RESERVE EARNINGS

1$^{ST}$ FIXED RATE ARBITRAGE YIELD
2$^{ND}$ FIXED RT ARB YLD PLUS RECOVERABLE COSTS
3$^{RD}$ PERIODIC RATES
4$^{TH}$ PERIODIC RATES PLUS RECOVERABLE COSTS
5$^{TH}$ TAXABLE PERIODIC RATE

| | | PERIODS |
|---|---|---|
| TAX-EXEMPT TAXABLE RATIO1 | 65.00% | 30 |
| TAX-EXEMPT TAXABLE RATIO2 | 0.00% | 0 |

| PV SAVINGS (LOSS) | PERIOD | INTEREST RATE EXCLUDING REMARKETING COSTS | CORPUS INVESTMENT RATE |
|---|---|---|---|
| N/A | 1 | 4.25% | 0.00% |
| | 2 | 4.25% | 0.00% |
| | 3 | 4.25% | 0.00% |
| 22,164,717 / 22.16% | 4 | 3.50% | 0.00% |
| | 5 | 3.50% | 0.00% |
| | 6 | 3.50% | 0.00% |
| | 7 | 3.50% | 0.00% |
| 15,980,817 / 15.98% | 8 | 3.50% | 0.00% |
| | 9 | 3.50% | 0.00% |
| | 10 | 3.50% | 0.00% |
| | 11 | 3.50% | 0.00% |
| | 12 | 3.50% | 0.00% |
| | 13 | 3.50% | 0.00% |
| | 14 | 3.50% | 0.00% |
| | 15 | 3.50% | 0.00% |
| | 16 | 3.50% | 0.00% |
| 15,980,817 / 15.98% | 17 | 3.50% | 0.00% |
| | 18 | 3.50% | 0.00% |
| | 19 | 3.50% | 0.00% |
| | 20 | 3.50% | 0.00% |
| | 21 | 3.50% | 0.00% |
| | 22 | 3.50% | 0.00% |
| | 23 | 3.50% | 0.00% |
| 16,697,434 / 16.70% | 24 | 3.50% | 0.00% |
| | 25 | 3.50% | 0.00% |
| | 26 | 3.50% | 0.00% |
| | 27 | 3.50% | 0.00% |
| | 28 | 3.50% | 0.00% |
| | 29 | 3.50% | 0.00% |
| | 30 | 3.50% | 0.00% |

The interest rate scenario analyzed in next several charts assumes that the marginal tax rate is reduce to 15% in year 8. Using any of our three approaches, VRDB debt service would still not exceed current fixed rate until interest rates rise above current levels in year 11.

For an issuer using one of the inventive structures, the budgetary impact would also occur in year 11, the interest reserve having been consumed in years four through seven to maintain budgetary stability.

For an issuer using one of the inventive structures, the budgetary impact in excess of fixed rated debt service would be partially absorbed by the remaining reserve in year eleven and would fully impact the budget in year twelve.

With one of the inventive structures, budgetary impact would occur in year 11 but would be smaller than in the other three cases as a result of the lower outstanding balance of principle.

For debt matched by short-term assets, the savings (loss) from VRDBs relative to fixed rate bonds is unchanged. But, VRDBs result in less budgetary volatility than fixed rate bonds. Here fixed and variable rate debt are matched by short term assets equal to the par amount of the bond issue.

Given a 65% ratio between the VRDB yield and the yield on the short-term taxable investments, if the assets equal 65% of the outstanding VRDBs, the VRDB interests and earnings on short-term assets will offset each other resulting in a net payment equal to VRDB principal.

This shows the budgetary impact of fixed or variable rate debt matched by an issuer's core short-term assets equal to 65% of par. Variable rate debt results in immediate savings and enhanced budgetary stability. Fixed rate bonds produce a better result only if interest rates rise. As bonds are retired, earnings exceed VRDB bond interest reintroducing a degree of volatility.

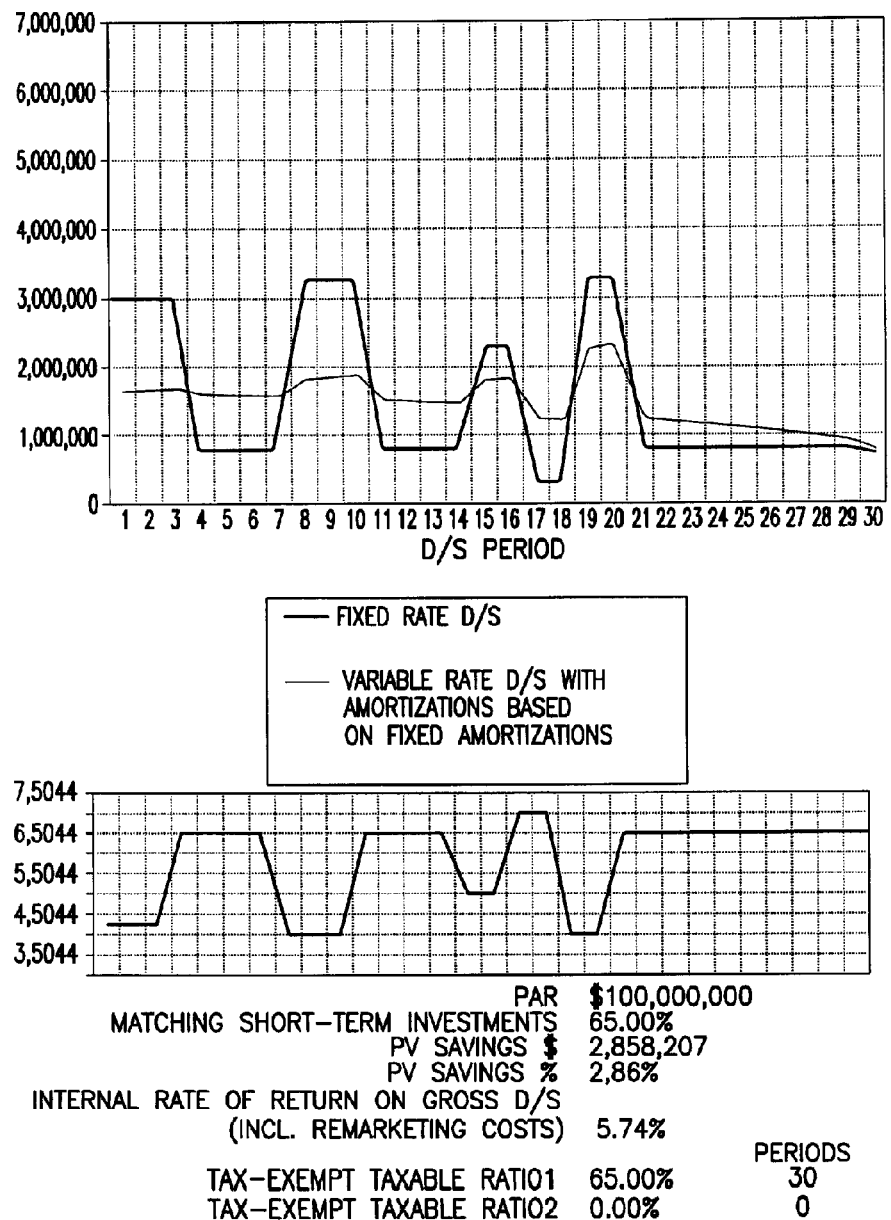

FIG.4Q

For debt matched by short-term assets, fixed rate debt costs money under current rates, but creates the possibility of a windfall for future taxpayers if interest rates rise significantly. With VRDBs current taxpayers benefit and future taxpayer are not at risk since the net cost of the VRDBs also declines if rates rise.

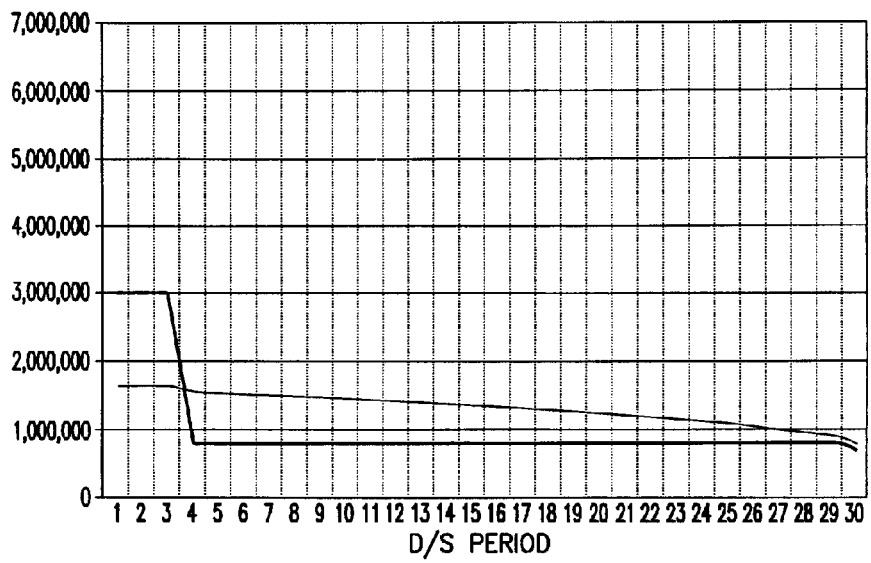

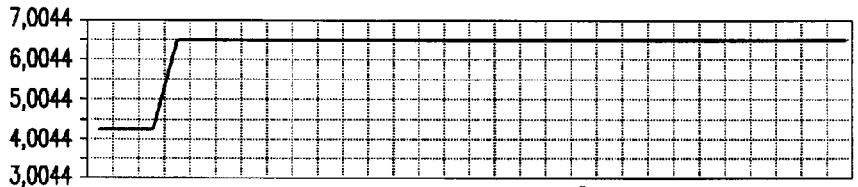

|  |  |  |
|---|---|---|
| PAR | $100,000,000 | |
| MATCHING SHORT-TERM INVESTMENTS | 65.00% | |
| PV SAVINGS $ | (2,617,204) | |
| PV SAVINGS % | −2.62% | |
| INTERNAL RATE OF RETURN ON GROSS D/S (INCL. REMARKETING COSTS) | 6.24% | |
| | | PERIODS |
| TAX-EXEMPT TAXABLE RATIO1 | 65.00% | 30 |
| TAX-EXEMPT TAXABLE RATIO2 | 0.00% | 0 |

FIG.4R

For debt matched by short-term assets, the cost of fixed rate debt relative to VRDBs is high for both current and future taxpayers if interest rates remain close to current levels or decline.

Even if the marginal tax rate declines to 15%, the net cost of VRDBs will approximately equal the net cost current taxpayers would pay today with fixed rate debt. Again, fixed rate debt costs current taxpayers today to create a possible benefit for future taxpayers.

METHOD, SOFTWARE PROGRAM, AND SYSTEM FOR MANAGING DEBT

CROSS-REFERENCE TO RELATED APPLICATIONS

This application is a continuation of U.S. application Ser. No. 09/896,630, filed Jun. 29, 2001, now U.S. Pat. No. 7,373,328 which is a continuation-in-part of U.S. application Ser. No. 09/723,692 filed Nov. 28, 2000 now abandoned. Each of the aforementioned applications is incorporated herein by reference in its entirely.

FIELD OF THE INVENTION

The present invention relates to a method, software program, and system for managing debt. More particularly, the present invention relates to a method, software program, and system for managing debt in the form of at least one credit issued by a borrower.

BACKGROUND OF THE INVENTION

Municipalities in general have debt structures that may rely exclusively or predominantly on fixed rate debt (such as "credits" in the form of loans, bonds, or other obligations). Some of the reasons may include the following:

a) Fixed rated debt is accepted and municipal debt managers do not have to justify their decision to use it, even if it imposes an additional cost on the municipality (the additional cost may be in essence the cost of interest rate insurance against the possibility that increasing interest rates may cause the cost of variable rate debt in the future to exceed the cost that can be locked in with fixed rate debt).

b) Interest rates may vary significantly within a budget period.

c) A debt manager may face political risk by issuing variable rate debt. The political risk to the debt manager if he or she elects to issue variable rate debt is not just that the present value cost of variable rate debt may exceed the cost of fixed rated debt over the term of the debt, but also includes the possible risk of being criticized if rates spike in a particular year or group of years, even if the savings in prior years were significant and there were net savings overall (in some cases there may not even be legislative authority to issue variable rate debt, ostensibly due to the interest rate risk associated with such debt).

d) Budgeting planned by a current debt manager may not be carried through in later years by subsequent debt managers and/or political decision makers (thus increasing future interest rate risk).

In issuing such traditional fixed rate debt (e.g., traditional municipal fixed rate bonds), a municipality pays its fixed rate bondholders a higher interest rate (versus non-fixed rate debt) to accept all of the risks and benefits of ownership of the municipal debt. In essence, the municipality purchases insurance against these risks from its fixed rate bondholders. The compensation to the fixed rate bondholders is both the higher fixed rate and the potential benefits associated with ownership of the debt.

On the other hand, when a municipality does utilize variable rate debt the changes over time in a municipality's variable interest rate generally occur because the issuer retains a variety of risks and benefits associated with ownership of municipal debt that, in the context of fixed rate debt, are transferred to the fixed rate bondholders. Thus, the issuer must generally revise the interest rate on its variable rate debt to reflect both favorable and unfavorable changes in market conditions that affect the value of ownership of the debt in order to keep the value of the debt essentially equal to par. The value of such traditional variable rate debt must be maintained essentially at par to motivate the current debt holder to retain its ownership or to enable the debt to be remarketed to a new holder if the debt is put back to the issuer by the current debt holder.

In any case, as seen in Table 1, a number of representative characteristics that generally affect the value of ownership of municipal debt (and the associated risks and benefits of ownership) include:

TABLE 1

| Characteristic | Risk | Benefit |
| --- | --- | --- |
| General level of interest rates | Increasing rates | Decreasing rates |
| Exemption from state/federal tax | Decrease in marginal tax rate or repeal of exemption | Tax increase |
| Credit of issuer | Improvement in credit | Credit deterioration |
| Credit of credit enhancer | Improvement in credit | Credit deterioration |
| Credit of liquidity provider | Improvement in credit | Credit deterioration |
| Supply and demand for municipal bonds | Increase in supply or decrease in demand | Decrease in supply or increase in demand |

As noted above, by issuing traditional fixed rate debt, an issuer essentially fully hedges each of the above characteristics (i.e., the issuer fixes both the cost and the benefit derived from the issuance of the debt). In contrast, by issuing traditional variable rate debt, the issuer retains both the risk and benefit associated with each ownership value characteristic. Given a specific bond interest rate, adverse changes with respect to any ownership value characteristic would cause a decline in the value of the bond and positive changes would cause an increase in the value of the bond. Thus, the issuer must increase the bond interest rate to compensate for adverse changes in order to be able to remarket its bonds. On the other hand, positive changes allow the issuer to decrease its bond interest rate while still being able to remarket its bonds.

Finally, it is noted that fixed-payer interest rate swaps (in which the issuer makes a fixed rate payment and receives a variable rate payment that offsets the interest payable on the issuer's variable rate bonds) are used to create fixed rate debt "synthetically" by fully or partially hedging the risks of debt ownership. As seen in Table 2, the extent to which such risks are hedged is determined by the methodology used to calculate the variable rate swap payment received by the issuer:

TABLE 2

| Variable swap payment | Risks hedged | Risks Not Hedged |
| --- | --- | --- |
| Issuer's actual bond interest rate | Interest rates<br>Federal and state taxes<br>Issuer credit<br>Credit enhancer and liquidity provider credit<br>Municipal supply and demand | None |
| Bond Market Association (BMA) rate | Interest rates<br>Federal taxes<br>Municipal supply and demand | State taxes<br>Issuer credit<br>Credit enhancer and liquidity provider credit |

TABLE 2-continued

| Variable swap payment | Risks hedged | Risks Not Hedged |
|---|---|---|
| BMA rate with a tax flip to a percentage of LIBOR upon certain events involving significant changes in the value of federal tax exemption | Interest rates Partial hedge of federal tax risk Municipal supply and demand | State taxes Issuer credit Credit enhancer and liquidity provider credit Federal tax risk not fully hedged |
| Fixed percentage of LIBOR | Interest rate risk | Federal and state taxes Issuer credit Credit enhancer and liquidity provider credit Municipal supply and demand |

Of note is the fact that the risk of a deviation between the interest rate on an issuer's variable rate bonds and the variable payment received by the issuer on a fixed-payer swap is referred to as "basis risk". Basis risk exists to some degree on any swap on which the payment received is not calculated using the issuer's actual interest rate.

Nevertheless, neither such traditional fixed rate debt, nor such traditional variable rate demand debt, nor such traditional fixed-payer interest rate swaps necessarily provides for the management of debt in a manner desired by the debt issuer.

Figure 1A:
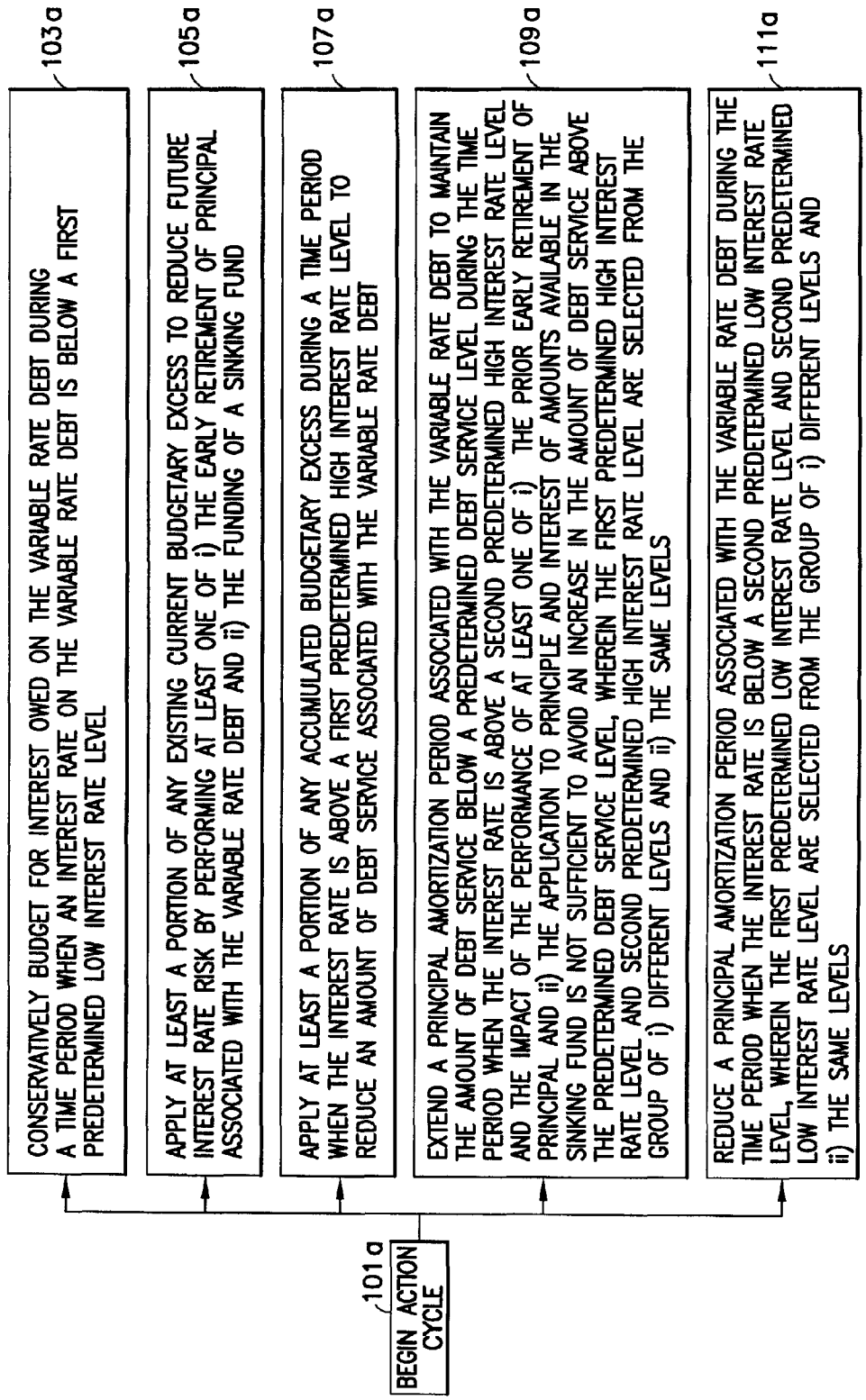
FIG. 1A shows a flowchart of a method according to one embodiment of the present invention.

Among those benefits and improvements that have been disclosed, other objects and advantages of this invention will become apparent from the following description taken in conjunction with the accompanying figures. The figures constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

In one embodiment, a method for managing variable rate debt comprising: budgeting for interest owed on the variable rate debt by the borrower during a time period when an interest rate on the variable rate debt is below a first predetermined low interest rate level; applying at least a portion of any existing current budgetary excess by the borrower to reduce future interest rate risk by performing at least one of i) the early retirement of principal associated with the variable rate debt and ii) the funding of a sinking fund; and applying at least a portion of any accumulated budgetary excess by the borrower during a time period when the interest rate is above a first predetermined high interest rate level to reduce an amount of debt service.

In another embodiment, the method may further comprise the step of extending a principal amortization period associated with the variable rate debt by the borrower to maintain the amount of debt service below a predetermined debt service level during the time period when the interest rate is above a second predetermined high interest rate level and the impact of the performance of at least one of i) the early retirement of principal and ii) the application to principle and interest of amounts available in the sinking fund is not sufficient to avoid an increase in the amount of debt service above the predetermined debt service level, wherein the first predetermined high interest rate level and second predetermined high interest rate level are selected from the group of i) different levels and ii) the same levels.

In yet another embodiment, the method may further comprise the step of reducing a principal amortization period associated with the variable rate debt by the borrower during the time period when the interest rate is below a second predetermined low interest rate level, wherein the first predetermined low interest rate level and second predetermined low interest rate level are selected from the group of i) different levels and ii) the same levels.

In a further embodiment, a software program for managing variable rate debt comprises: budgeting means for calculating a budget for interest owed on the variable rate debt during a time period when an interest rate on the variable rate debt is below a first predetermined low interest rate level; current budgetary excess disposition calculation means for calculating a value of at least a portion of any existing current budgetary excess to be applied to reduce future interest rate risk by performing at least one of i) the early retirement of principal associated with the variable rate debt and ii) the funding of a sinking fund; and accumulated budgetary excess disposition calculation means for calculating a value of at least a portion of any accumulated budgetary excess to be applied during a time period when the interest rate is above a first predetermined high interest rate level to reduce an amount of debt service.

In another embodiment, the software program may further comprise a principal amortization extension calculation means for calculating an extension to a principal amortization period associated with the variable rate debt to maintain the amount of debt service below a predetermined debt service level during the time period when the interest rate is above a second predetermined high interest rate level and the impact of the performance of at least one of i) the early retirement of principal and ii) the application to principle and interest of amounts available in the sinking fund is not sufficient to avoid an increase in the amount of debt service above the predetermined debt service level, wherein the first predetermined high interest rate level and second predetermined high interest rate level are selected from the group of i) different levels and ii) the same levels.

In yet another embodiment, a system for managing variable rate debt comprises: memory means for storing a software program; and processing means for processing the software program; wherein the software program includes: budgeting means for calculating a budget for interest owed on the variable rate debt during a time period when an interest rate on the variable rate debt is below a first predetermined low interest rate level; current budgetary excess disposition calculation means for calculating a value of at least a portion of any existing current budgetary excess to be applied to reduce future interest rate risk by performing at least one of i) the early retirement of principal associated with the variable rate debt and ii) the funding of a sinking fund; and accumulated budgetary excess disposition calculation means for calculating a value of at least a portion of any accumulated budgetary excess to be applied during a time period when the interest rate is above a first predetermined high interest rate level to reduce an amount of debt service.

In yet a further embodiment, the system may further include the software program further comprising principal amortization extension calculation means for calculating an extension to a principal amortization period associated with the variable rate debt to maintain the amount of debt service below a predetermined debt service level during the time period when the interest rate is above a second predetermined high interest rate level and the impact of the performance of at least one of i) the early retirement of principal and ii) the application to principle and interest of amounts available in the sinking fund is not sufficient to avoid an increase in the amount of debt service above the predetermined debt service level, wherein the first predetermined high interest rate level and second predetermined high interest rate level are selected from the group of i) different levels and ii) the same levels.

In an embodiment, a method for managing debt created by an issuer using an interest rate swap in which the issuer makes a fixed rate payment and receives a variable rate payment that at least partially offsets an interest payment on a variable rate bond issued by the issuer, comprises: budgeting an amount by the issuer to cover the fixed rate payment, wherein the budgeted amount is higher than the amount of the fixed rate payment; and applying at least a portion of any current budgetary excess by the issuer resulting from the receipt of the variable rate payment at a level that produces a payment higher than the interest payment on the variable rate bond to perform at least one of i) the early retirement of principal associated with the synthetic fixed rate debt and ii) the funding of a sinking fund.

In a further embodiment, the method further comprises the step of applying at least a portion of any funds in the sinking fund by the issuer to the interest payment on the variable rate bond if the interest payment on the variable rate bond increases above a predetermined high interest rate level.

In yet another embodiment, the method further comprises the step of extending a principal amortization period by the issuer associated with the variable rate bond when the variable rate payment received by the issuer is less than the interest payment on the variable rate bond.

In another embodiment, a method for managing variable rate debt comprises: obligating the borrower to budget for interest owed on the variable rate debt during a time period when an interest rate on the variable rate debt is below a first predetermined low interest rate level to produce a current budgetary excess; and obligating at least a portion of the current budgetary excess be applied by the borrower to reduce future interest rate risk by performing at least one of i) the early retirement of principal associated with the variable rate debt and the funding of a sinking fund.

In yet another embodiment, the method further comprises obligating that at least a portion of any accumulated budgetary excess be applied by the borrower during a time period when the interest rate is above a first predetermined high interest rate level to reduce an amount of debt service associated with the variable rate debt.

In yet another embodiment, the method of further comprises obligating that at least a portion of any accumulated funds in the sinking fund be applied by the borrower during a time period when the interest rate is above a first predetermined high interest rate level to reduce an amount of debt service associated with the variable rate debt.

In a further embodiment, the borrower may be allowed or required to apply at least one of the current budgetary excess and the accumulated budgetary excess to different credits within a fund of credits. At least two of the credits in the fund of credits may be issued at different times.

The software program may further comprise principal amortization reduction calculation means for calculating a reduction to a principal amortization period associated with the variable rate debt during the time period when the interest rate is below a second predetermined low interest rate level, wherein the first predetermined low interest rate level and second predetermined low interest rate level are selected from the group of i) different levels and ii) the same levels.

In one embodiment, the credit may be a bond.

The software program of the system may further comprise principal amortization reduction calculation means for calculating a reduction to a principal amortization period associated with the variable rate debt during the time period when the interest rate is below a second predetermined low interest rate level, wherein the first predetermined low interest rate level and second predetermined low interest rate level are selected from the group of i) different levels and ii) the same levels.

In another embodiment a method for managing basis risk associated with synthetic fixed rate debt created by an issuer using an interest rate swap in which the issuer makes a fixed rate payment and receives a variable rate payment that at least partially offsets an interest payment on a variable rate bond issued by the issuer is provided, including: allowing or requiring the issuer to budget a budgeted amount to cover the fixed rate payment, wherein the budgeted amount is higher than the amount of the fixed rate payment; and allowing or requiring the issuer to use at least a portion of any current budgetary excess resulting from the receipt of the variable rate payment at a level that produces a payment higher than the interest payment on the variable rate bond to perform at least one of i) the early retirement of principal associated with the synthetic fixed rate debt and ii) the funding of a sinking fund.

The method may further comprise allowing or requiring the issuer to apply at least a portion of any funds in the sinking fund to the interest payment on the variable rate bond if the interest payment on the variable rate bond increases above a predetermined high interest rate level.

The predetermined high interest rate level may be a predetermined excess over a current interest rate associated with the variable rate payment to the issuer.

Any amounts applied from the sinking fund may be excluded from a rate covenant calculation associated with the synthetic fixed rate debt.

The method may further comprise the step of allowing or requiring the issuer to extend a principal amortization period associated with the variable rate bond when the variable rate payment received by the issuer is less than the interest payment on the variable rate bond.

The method may further comprise the step of allowing or requiring the issuer to reduce a principal amortization period associated with the variable rate bond when the variable rate payment received by the issuer exceeds the interest payment on the variable rate bond.

In another embodiment a software program for managing basis risk associated with synthetic fixed rate debt created by an issuer using an interest rate swap in which the issuer makes a fixed rate payment and receives a variable rate payment that at least partially offsets an interest payment on a variable rate bond issued by the issuer is provided, including: budgeting means for calculating a budgeted amount to cover the fixed rate payment, wherein the budgeted amount is higher than the amount of the fixed rate payment; and current budgetary excess disposition calculation means for calculating the value of at least a portion of any current budgetary excess resulting from the receipt of the variable rate payment at a level that produces a payment higher than the interest payment on the variable rate bond to perform at least one of i) the early retirement of principal associated with the synthetic fixed rate debt and ii) the funding of a sinking fund.

The software program may further comprise sinking fund disposition calculation means for calculating the value of at least a portion of any funds in the sinking fund to be applied to the interest payment on the variable rate bond if the interest payment on the variable rate bond increases above a predetermined high interest rate level.

The predetermined high interest rate level may be a predetermined excess over a current interest rate associated with the variable rate payment to the issuer.

The software program may further comprise principal amortization extension calculation means for calculating an extension to a principal amortization period associated with the variable rate bond when the variable rate payment received by the issuer is less than the interest payment on the variable rate bond.

The software program may further comprise principal amortization reduction calculation means for calculating a reduction in a principal amortization period associated with the variable rate bond when the variable rate payment received by the issuer exceeds the interest payment on the variable rate bond.

In another embodiment a system for managing basis risk associated with synthetic fixed rate debt created by an issuer using an interest rate swap in which the issuer makes a fixed rate payment and receives a variable rate payment that at least partially offsets an interest payment on a variable rate bond issued by the issuer is provided, including: memory means for storing a software program; and processing means for processing the software program; wherein the software program includes: budgeting means for calculating a budgeted amount to cover the fixed rate payment, wherein the budgeted amount is higher than the amount of the fixed rate payment; and current budgetary excess disposition calculation means for calculating the value of at least a portion of any current budgetary excess resulting from the receipt of the variable rate payment at a level that produces a payment higher than the interest payment on the variable rate bond to perform at least one of i) the early retirement of principal associated with the synthetic fixed rate debt and ii) the funding of a sinking fund.

The software program of the system may further comprise sinking fund disposition calculation means for calculating the value of at least a portion of any funds in the sinking fund to be applied to the interest payment on the variable rate bond if the interest payment on the variable rate bond increases above a predetermined high interest rate level.

The predetermined high interest rate level may be a predetermined excess over a current interest rate associated with the variable rate payment to the issuer.

The software program of the system may further comprise principal amortization extension calculation means for calculating an extension to a principal amortization period associated with the variable rate bond when the variable rate payment received by the issuer is less than the interest payment on the variable rate bond.

The software program of the system may further comprise principal amortization reduction calculation means for calculating a reduction in a principal amortization period associated with the variable rate bond when the variable rate payment received by the issuer exceeds the interest payment on the variable rate bond.

More particularly, the present invention provides for what will hereinafter be referred to as the Municipal Interest Rate Risk Management Program ("MIRRMP"). In one embodiment of the present invention the MIRRMP may be applied to variable rate debt (e.g., unhedged variable rate debt). Under this embodiment of the MIRRMP approach, the use of variable rate debt by municipal debt managers (or by municipalities that have not yet authorized variable rate debt due to concerns about interest rate risk) is facilitated by helping to reduce the political risk to the debt managers and municipalities if interest rates rise. The MIRRMP approach as applied to variable rate debt may include one or more of the following: a) allowing or requiring conservative budgeting for variable rate debt interest while interest rates are low (e.g., wherein conservative budgeting may include budgeting at a fixed rate and/or at a higher interest rate than is actually expected); b) allowing or requiring that an amount of the current budgetary excess determined by formula be applied to reduce future interest rate risk either by retiring principal early or by funding a sinking fund; c) allowing or requiring the accumulated budgetary excess to be applied in future years when rates are high to reduce the amount of annual debt service; d) allowing or requiring current and accumulated budgetary excess to be applied (whether by retiring debt or by funding a sinking fund for a higher yield bond or a taxable bond, for example) across a series of credits (such as variable rate bonds and/or or fixed rate bonds) issued at different times in order to apply the excess in the most financially advantageous way and to reduce the impact of federal arbitrage limitations.

Further, for borrowers (or "issuers") with a variety of credits within a particular fund, the MIRRMP approach may allow or require the budgetary excess to be applied across different credits.

Further still, to reduce the probability of a spike in rates causing a budgetary problem even in early years, the MIRRMP approach may allow or require the extension of the principal amortization (e.g., from 30 to 35 years) to maintain annual debt service at a predetermined level if rates should rise and the impact of a) the early retirement of principal and/or b) amounts available in the sinking fund to be applied to principal and interest is not sufficient to avoid an increase in debt service.

Further still, when rates are low a higher amortization (i.e., a reduction in term) could be allowed or required compared to the amortization associated with fixed rate credits. Conversely, when rates are high a reduced (i.e., an extended term) or eliminated amortization could be allowed or required in order to maintain debt service at a predetermined budgetary level.

Further still, it is believed that the MIRRMP approach should allow an issuer to exceed the standard 20% limit on variable rate debt (excluding those hedged by short-term assets) imposed by some rating agencies (e.g., STANDARD & POORS) since the interest risk is significantly reduced. In fact, it is believed that the MIRRMP approach could even obtain the issuer a rating benefit because the practical impact of the MIRRMP is likely to amortize debt more quickly.

Further still, for an issuer that comes to market regularly, the interest risk could be additionally reduced by issuing a portion of each financing as variable rate debt. So, even if rates rise generally, the savings from later issues together with the accumulated excess from earlier issues could be sufficient to prevent debt service from exceeding a predetermined budgetary amount. For an issuer with a lot of outstanding debt, the same economic effect could be accomplished by periodically converting a portion of the issuer's debt to variable rate debt through the use of interest rate swaps.

Typically, income from a municipality's short-term assets is generally affected by changes in interest rates in a manner inverse to the cost of variable rate debt. In other words, during times of rising interest rates, the additional income from a municipality's short term assets would likely offset any increase in the cost of the municipality's variable rate debt. Conversely, during times of falling interest rates, the reduced income from a municipality's short term assets would likely be offset by a decrease in the cost of the municipality's variable rate debt. Thus, combining variable rate debt (rather than fixed rate debt) with a municipality's variable rate assets should result in budgetary stability in that net debt service (variable rate debt service less earnings of short term assets) remains relatively constant regardless of what happens to interest rates. By contrast, combining fixed rated debt with variable rate assets should result in higher net debt service if rates either remain near current levels or go down and lower net debt service if rates increase significantly (producing budgetary volatility as rates rise or fall).

In addition, if financial conditions produce: a) an inverted tax-exempt yield curve (which, it is believed, is generally not seen); and/or b) a significant decrease in the federal tax rate then a borrower could incur current year losses on earlier variable interest rate debt (versus the fixed rates at which the credits, such as bonds, could have been issued).

In another embodiment of the present invention, the MIRRMP may be applied to moderate basis risk associated with an interest rate swap.

More particularly, just as the MIRRMP approach of the present invention can be used to manage the budgetary impact of unhedged variable rate debt, it can also be employed to manage the budgetary impact of basis risk for synthetic fixed rated debt.

In one particular example (which is intended for illustration only, and is not intended to be restrictive), assume that an issuer creates synthetic fixed rate debt using a fixed-payer swap under which the variable rate received by the issuer equals BMA ("Bond Market Association"), with a tax flip to 65% of the London Interbank Offered Rate ("LIBOR") if the marginal tax rate is reduced below 25%. The issuer would have four potential sources of basis risk:

1. Issuer credit risk;
2. Credit enhancer and liquidity provider credit risk
3. State tax risk; and
4. Federal tax risk if a tax flip occurs.

Further, assume that the issuer's variable rate debt is expected to trade at BMA and that the issuer's fixed swap payment is equal to 4.50%.

Given these conditions, the issuer could obligate itself under the MIRRMP approach of the present invention to budget at a slightly higher amount based on a 4.52% fixed swap rate and to receive a variable payment based on BMA plus 2 basis points. To the extent that the issuer's variable rate debt trades, as expected, at BMA or better, the excess amounts received by the issuer could be used to retire principal and/or to fund a sinking fund. Amounts in the sinking fund could be drawn upon in later years if the variable rate debt traded at a rate higher than BMA plus 2 basis points in order to mitigate the budgetary impact of the basis mismatch. Amounts funded from the sinking fund could be excluded from the rate covenant calculation.

Moreover, the variable rate debt could be structured under the MIRRMP approach of the present invention with a longer nominal maturity and with an amortization determined by formula. To the extent that the issuer's variable rate exceeds the variable swap payments (including the results of a tax flip), the amortization could be adjusted (e.g., extended) so as to maintain the issuer's budgetary requirement unchanged. Similarly, additional principal could be amortized from any amounts by which the variable swap payment exceeds the issuer's variable rate. It is noted that the ability to adjust the amortization may be limited by legal requirements governing amortization of the issuer's bonds.

Referring now to FIG. 1A, a flowchart showing a method for managing variable rate debt according to one embodiment of the present invention is shown. As seen in this Fig., starting at Step 101a a borrower begins an action cycle. Each action cycle may occur periodically, such as monthly or annually, for example. During an action cycle the borrower (or the borrower's representative) carries out each step of the method as required given prevailing interest rates and budgetary excess.

More particularly, it is seen that at Step 103a the borrower is required to conservatively budget for interest owed on the variable rate debt during a time period when an interest rate on the variable rate debt is below a first predetermined low interest rate level. At Step 105a the borrower is required to apply at least a portion of any existing current budgetary excess to reduce future interest rate risk by performing at least one of i) the early retirement of principal associated with the variable rate debt and ii) the funding of a sinking fund. At Step 107a the borrower is required to apply at least a portion of any accumulated budgetary excess during a time period when the interest rate is above a first predetermined high interest rate level to reduce an amount of debt service associated with the variable rate debt. At Step 109a the borrower is required to extend a principal amortization period associated with the variable rate debt to maintain the amount of debt service below a predetermined debt service level during the time period when the interest rate is above a second predetermined high interest rate level and the impact of the performance of at least one of i) the early retirement of principal and ii) the application to principle and interest of amounts available in the sinking fund is not sufficient to avoid an increase in the amount of debt service above the predetermined debt service level, wherein the first predetermined high interest rate level and second predetermined high interest rate level are selected from the group of i) different levels and ii) the same levels. At Step 111a the borrower is required to reduce a principal amortization period associated with the variable rate debt during the time period when the interest rate is below a second predetermined low interest rate level, wherein the first predetermined low interest rate level and second predetermined low interest rate level are selected from the group of i) different levels and ii) the same levels. The borrower may be required to apply at least one of the current budgetary excess and the accumulated budgetary excess to different credits within a fund of credits. At least two of the credits in the fund of credits may be issued at different times and one or more of the credits may be a bond.

It should be noted that the steps described above do not necessarily need to be carried out in the order indicated and not all steps necessarily need to be carried out during any given cycle.

Figure 1B:
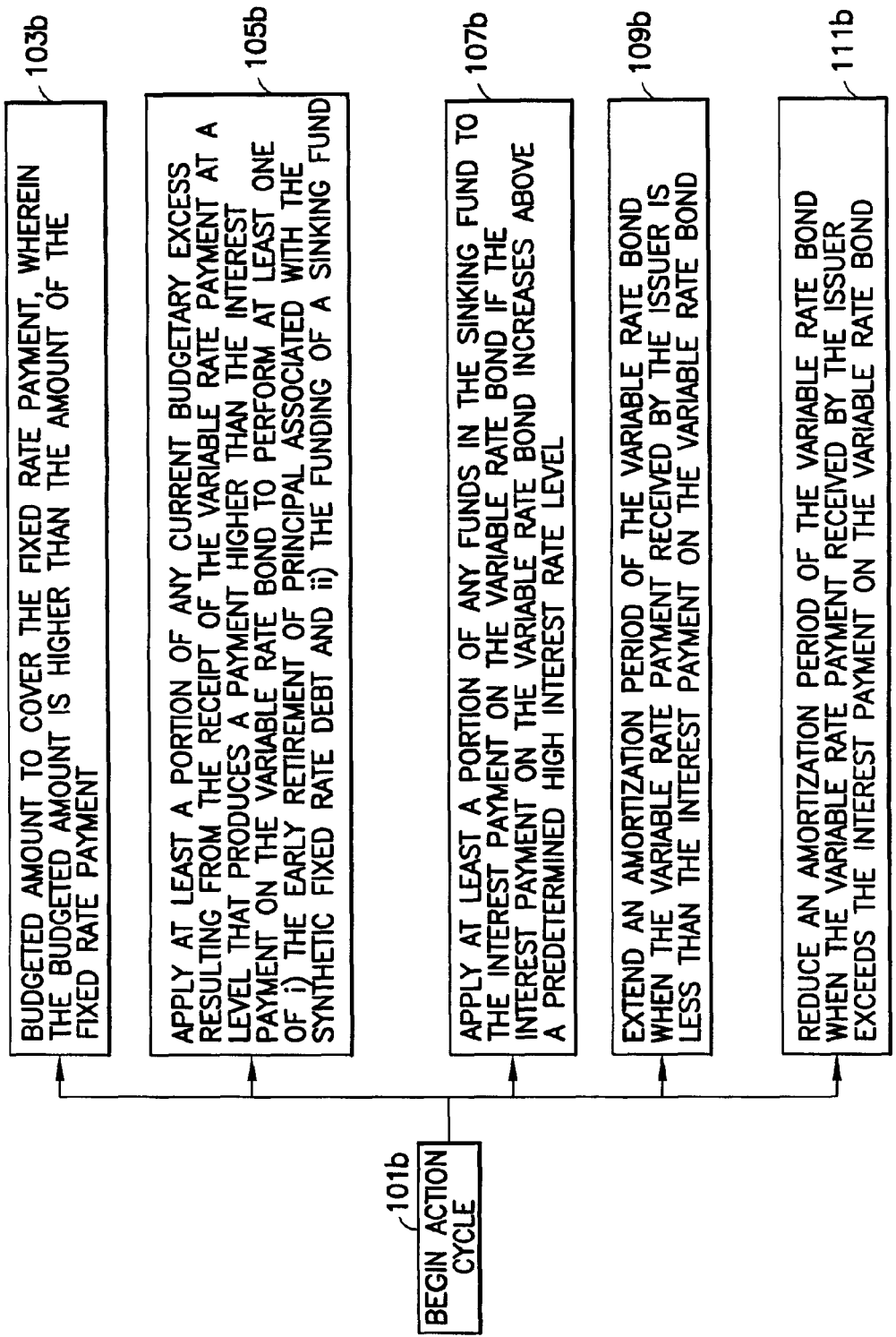
FIG. 1B shows a flowchart of a method according to another embodiment of the present invention.

Referring now to FIG. 1B, a flowchart showing a method for managing basis risk associated with synthetic fixed rate debt created by an issuer using an interest rate swap in which the issuer makes a fixed rate payment and receives a variable rate payment that at least partially offsets an interest payment on a variable rate bond issued by the issuer according to another embodiment of the present invention is shown. As seen in this Fig., starting at Step 101b an issuer begins an action cycle. Each action cycle may occur periodically, such as monthly or annually, for example. During an action cycle the issuer (or the issuer's representative) carries out each step of the method as required given prevailing interest rates and budgetary excess.

More particularly, it is seen that at Step 103b the issuer is required to budget a budgeted amount to cover the fixed rate payment, wherein the budgeted amount is higher than the amount of the fixed rate payment. At Step 105b the issuer is required to apply at least a portion of any current budgetary excess resulting from the receipt of the variable rate payment at a level that produces a payment higher than the interest payment on the variable rate bond to perform at least one of i) the early retirement of principal associated with the synthetic fixed rate debt and ii) the funding of a sinking fund. At Step 107b the issuer is required to apply at least a portion of any funds in the sinking fund to the interest payment on the variable rate bond if the interest payment on the variable rate bond increases above a predetermined high interest rate level. The predetermined high interest rate level may be a predetermined excess over a current interest rate associated with the variable rate payment to the issuer. Any amounts applied from the sinking fund may be excluded from a rate covenant calculation associated with the synthetic fixed rate debt. At Step 109b an amortization period of the variable rate bond is extended when the variable rate payment received by the issuer is less than the interest payment on the variable rate bond. At Step 111b an amortization period of the variable rate bond is reduced when the variable rate payment received by the issuer exceeds the interest payment on the variable rate bond.

It should be noted that the steps described above do not necessarily need to be carried out in the order indicated and not all steps necessarily need to be carried out during any given cycle. For example, in one embodiment, after Step 101b, Steps 103b, 105b and 107b are conducted together, In another embodiment, after Step 101b, only Step 109b is conducted. In yet another embodiment, after Step 101b, Steps 103b, 105b, 107b and 109h are conducted together. In a further embodiment, after Step 101b, Steps 109b and 111b are conducted together. In yet a further embodiment, after Step 101b, only Step 111b is conducted.

Figure 2A:
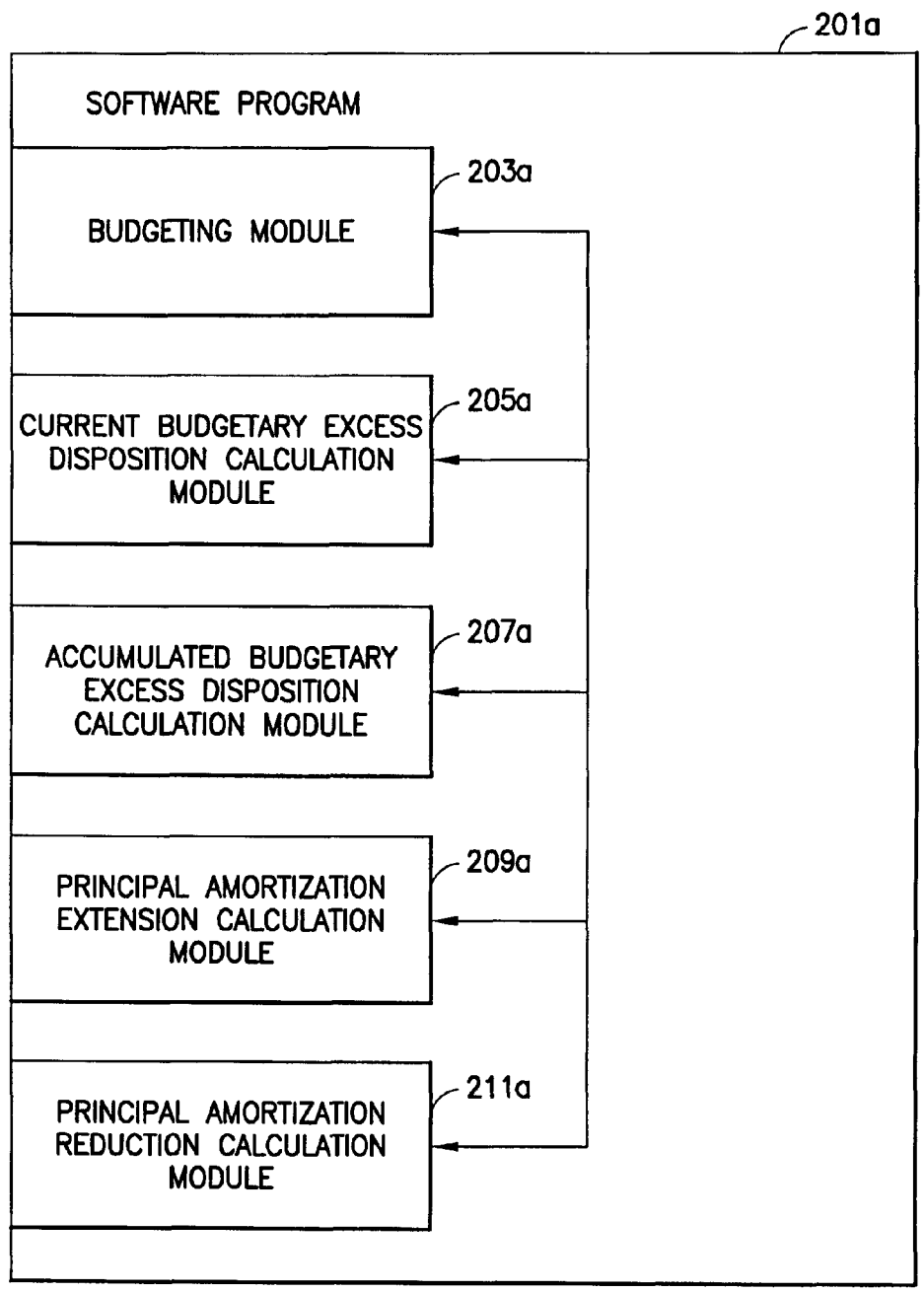
FIG. 2A shows a block diagram of a software program according to another embodiment of the present invention.

Referring now to FIG. 2A, a block diagram of a software program for managing variable rate debt according to one embodiment of the present invention is shown. As seen in this Fig., Software Program 201a includes:
1) Budgeting Module 203a for calculating a conservative budget for interest owed on the variable rate debt during a time period when an interest rate on the variable rate debt is below a first predetermined low interest rate level;
2) Current Budgetary Excess Disposition Calculation Module 205a for calculating a value of at least a portion of any existing current budgetary excess to be applied to reduce future interest rate risk by performing at least one of i) the early retirement of principal associated with the variable rate debt and ii) the funding of a sinking fund;
3) Accumulated Budgetary Excess Disposition Calculation Module 207a for calculating a value of at least a portion of any accumulated budgetary excess to be applied during a time period when the interest rate is above a first predetermined high interest rate level to reduce an amount of debt service associated with the variable rate debt;
4) Principal Amortization Extension Calculation Module 209a for calculating an extension to a principal amortization period associated with the variable rate debt to maintain the amount of debt service below a predetermined debt service level during the time period when the interest rate is above a second predetermined high interest rate level and the impact of the performance of at least one of i) the early retirement of principal and ii) the application to principle and interest of amounts available in the sinking fund is not sufficient to avoid an increase in the amount of debt service above the predetermined debt service level, wherein the first predetermined high interest rate level and second predetermined high interest rate level are selected from the group of i) different levels and ii) the same levels; and
5) Principal Amortization Reduction Calculation Module 211a for calculating a reduction to a principal amortization period associated with the variable rate debt during the time period when the interest rate is below a second predetermined low interest rate level, wherein the first predetermined low interest rate level and second predetermined low interest rate level are selected from the group of i) different levels and ii) the same levels.

Figure 2B:
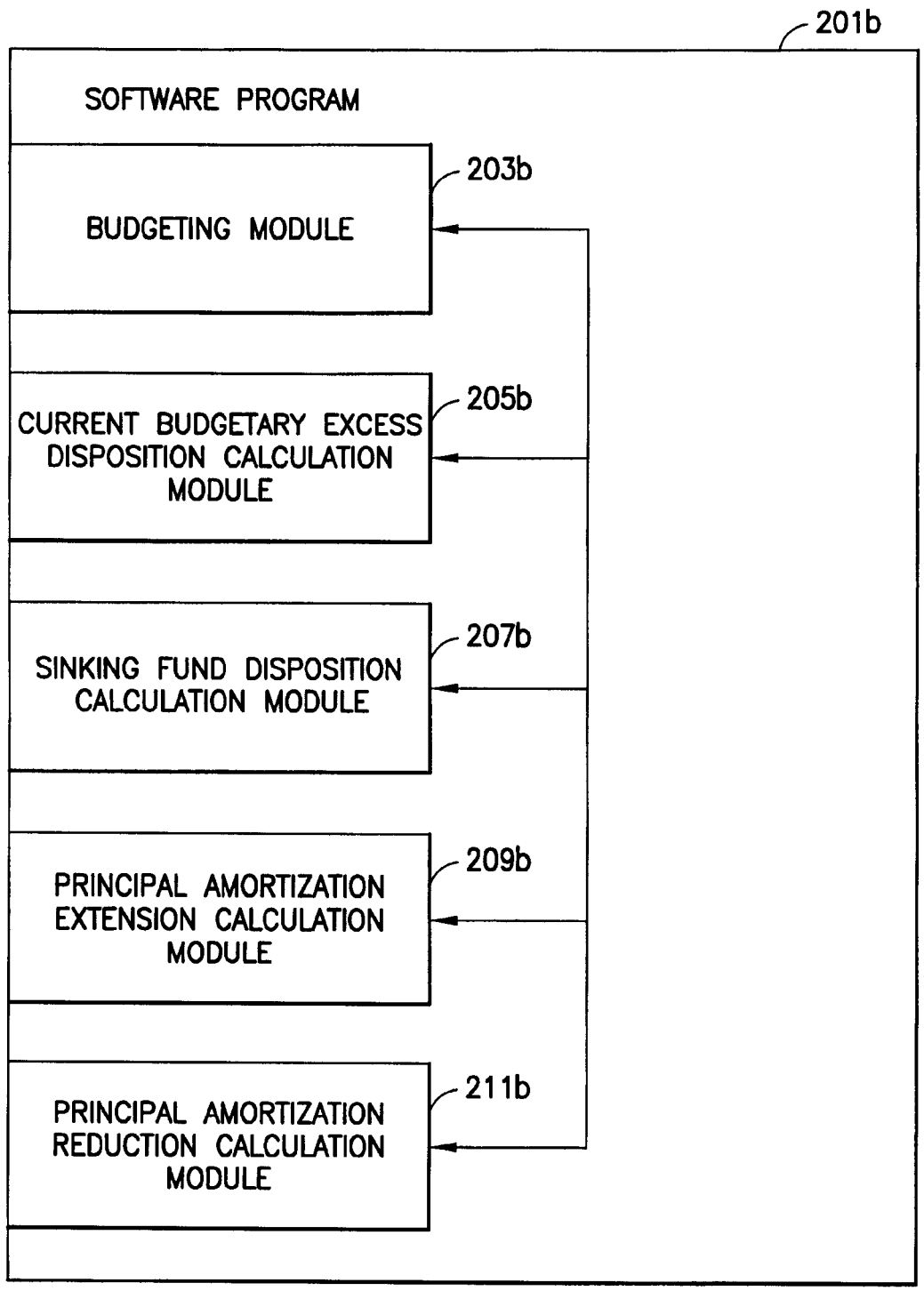
FIG. 2B shows a block diagram of a software program according to another embodiment of the present invention.

Referring now to FIG. 2B, a block diagram of a software program for managing basis risk associated with synthetic fixed rate debt created by an issuer using an interest rate swap in which the issuer makes a fixed rate payment and receives a variable rate payment that at least partially offsets an interest payment on a variable rate bond issued by the issuer according to one embodiment of the present invention is shown. As seen in this Fig., Software Program 201b includes:
1) Budgeting Module 203b for calculating a budgeted amount to cover the fixed rate payment, wherein the budgeted amount is higher than the amount of the fixed rate payment;
2) Current Budgetary Excess Disposition Calculation Module 205b for calculating the value of at least a portion of any current budgetary excess resulting from the receipt of the variable rate payment at a level that produces a payment higher than the interest payment on the variable rate bond to perform at least one of i) the early retirement of principal associated with the synthetic fixed rate debt and ii) the funding of a sinking fund;
3) Sinking Fund Disposition Calculation Module 207b for calculating the value of at least a portion of any funds in the sinking fund to be applied to the interest payment on the variable rate bond if the interest payment on the variable rate bond increases above a predetermined high interest rate level;
4) Principal Amortization Extension Calculation Module 209b for calculating an extension to a principal amortization period associated with the variable rate bond when the variable rate payment received by the issuer is less than the interest payment on the variable rate bond; and
5) Principal Amortization Reduction Calculation Module 211b for calculating a reduction in a principal amortization period associated with the variable rate bond when the variable rate payment received by the issuer exceeds the interest payment on the variable rate bond.

Figure 3:
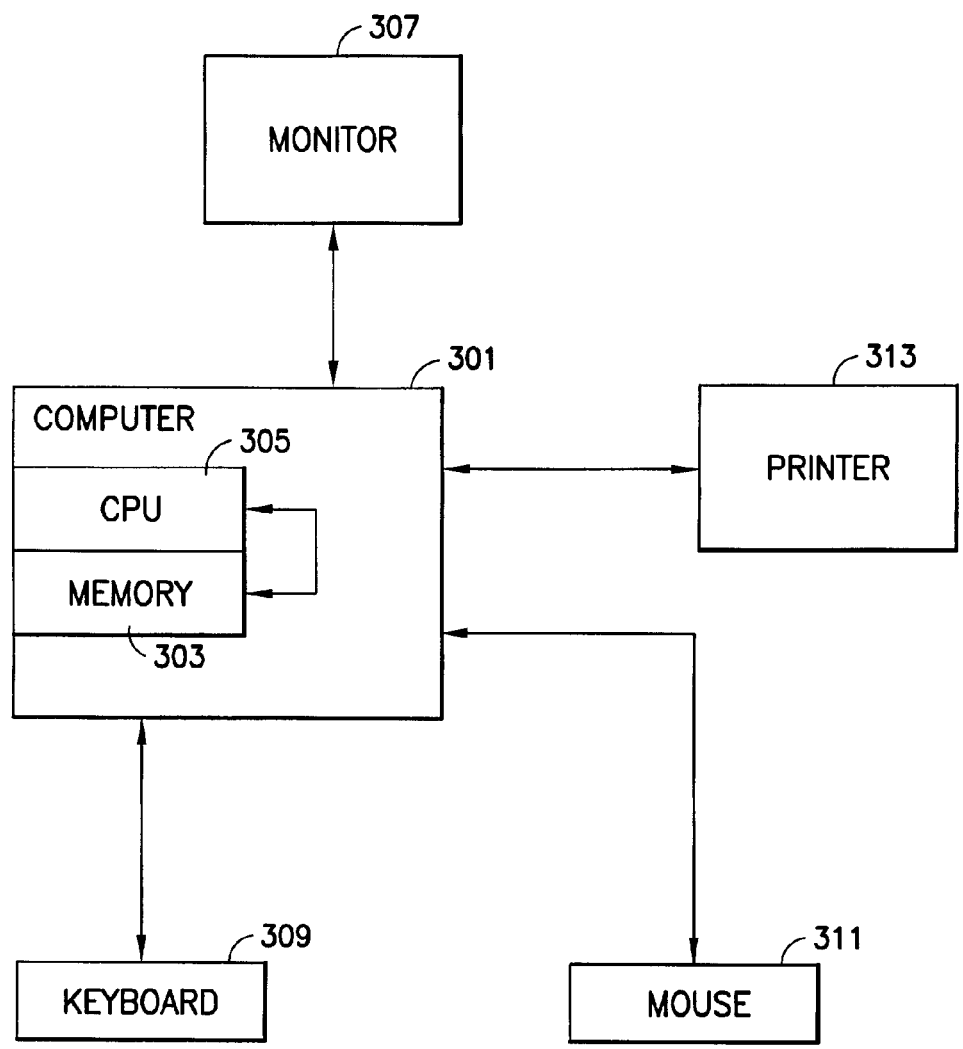
FIG. 3 shows a block diagram of a system according to another embodiment of the present invention.
Figure 4A:
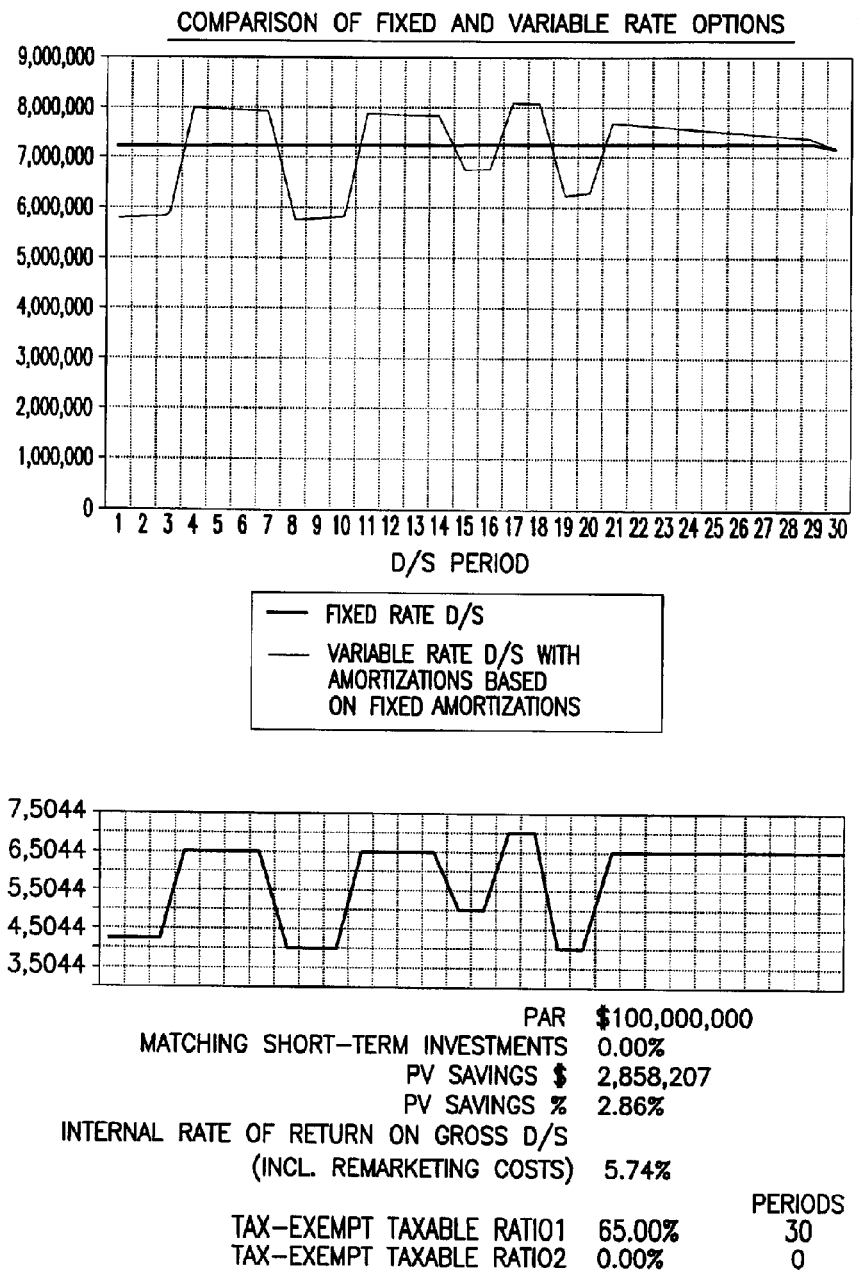
FIGS. 4A-4T show various comparisons of fixed and variable rate options.
Figure 4B:
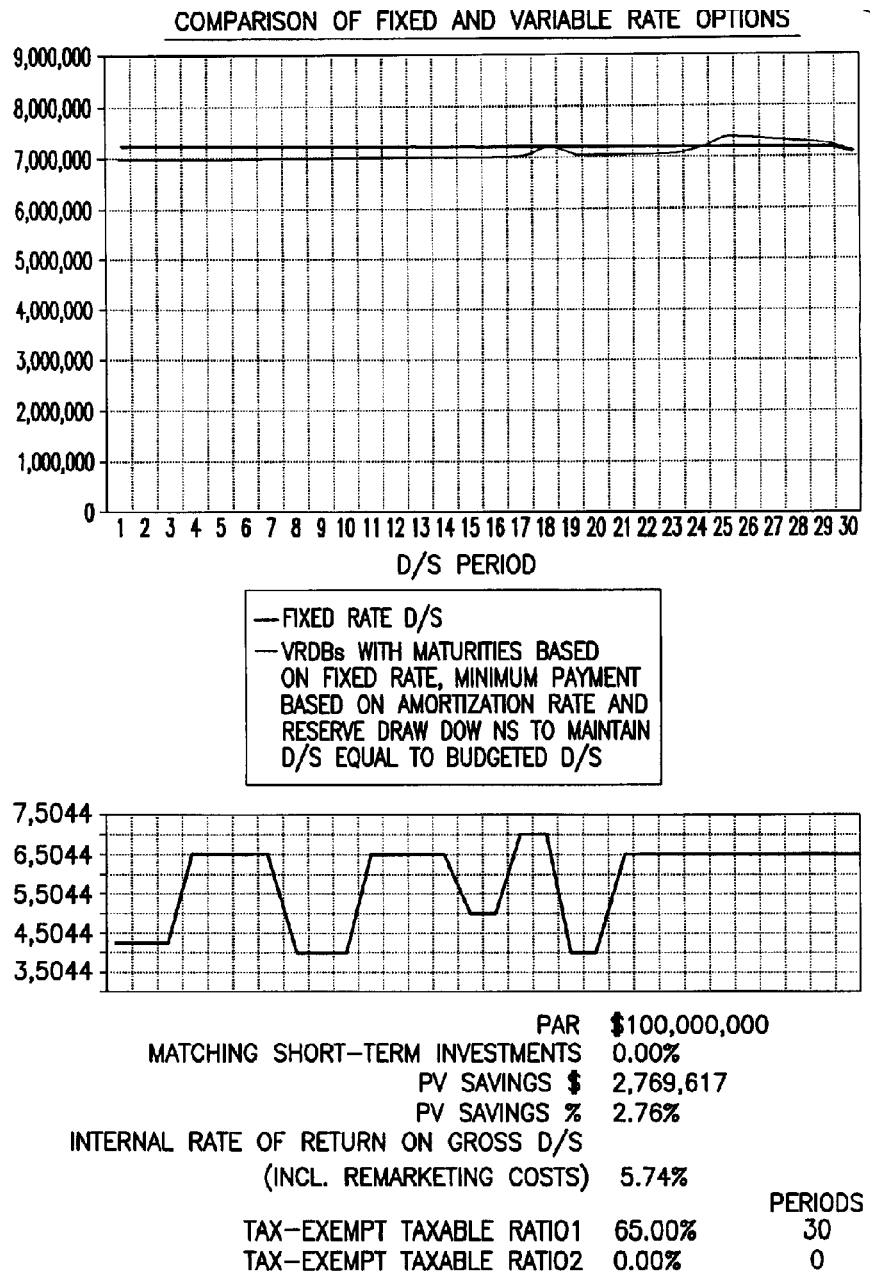
Figure 4C:
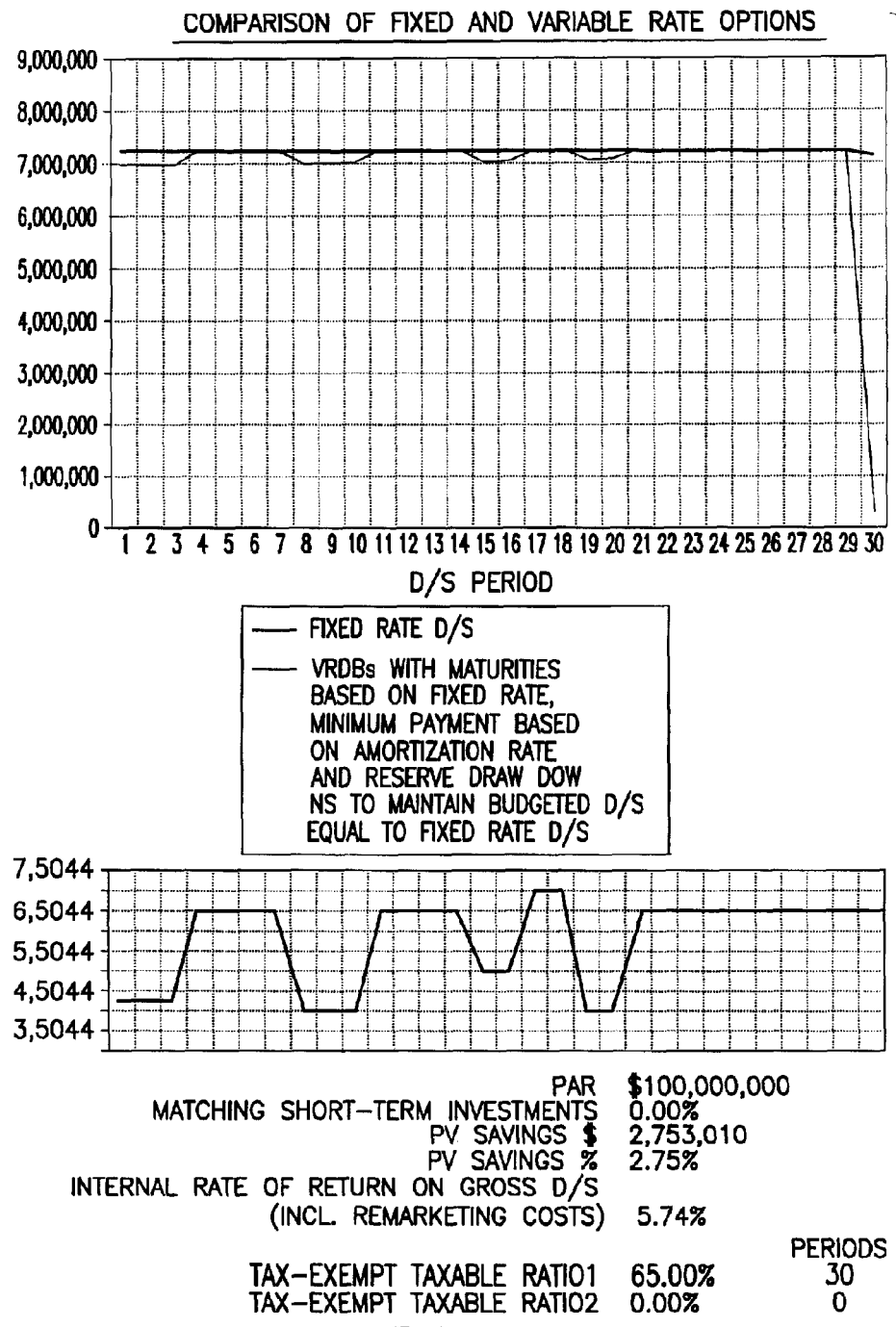
Figure 4D:
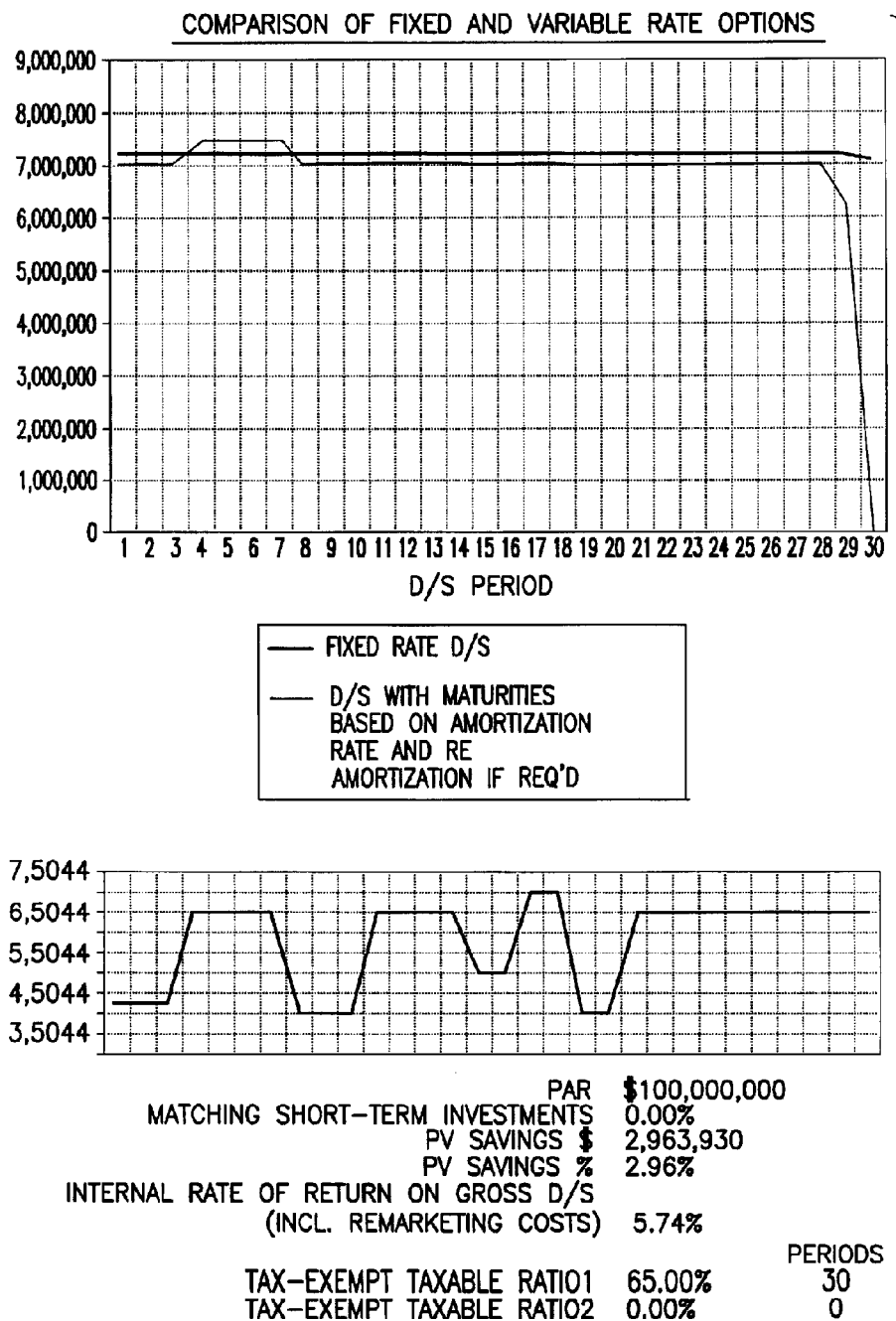
Figure 4E:
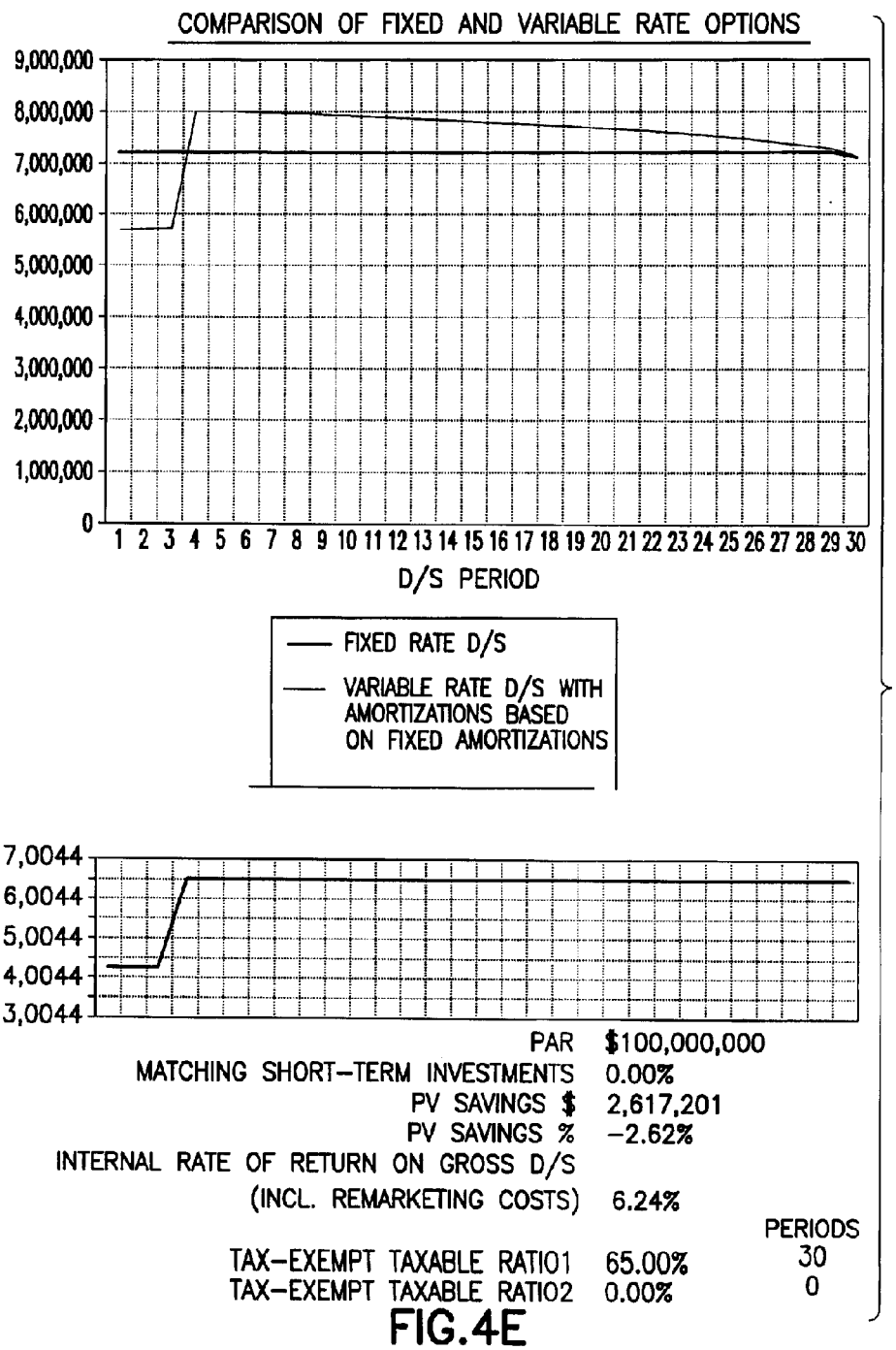
Figure 4F:
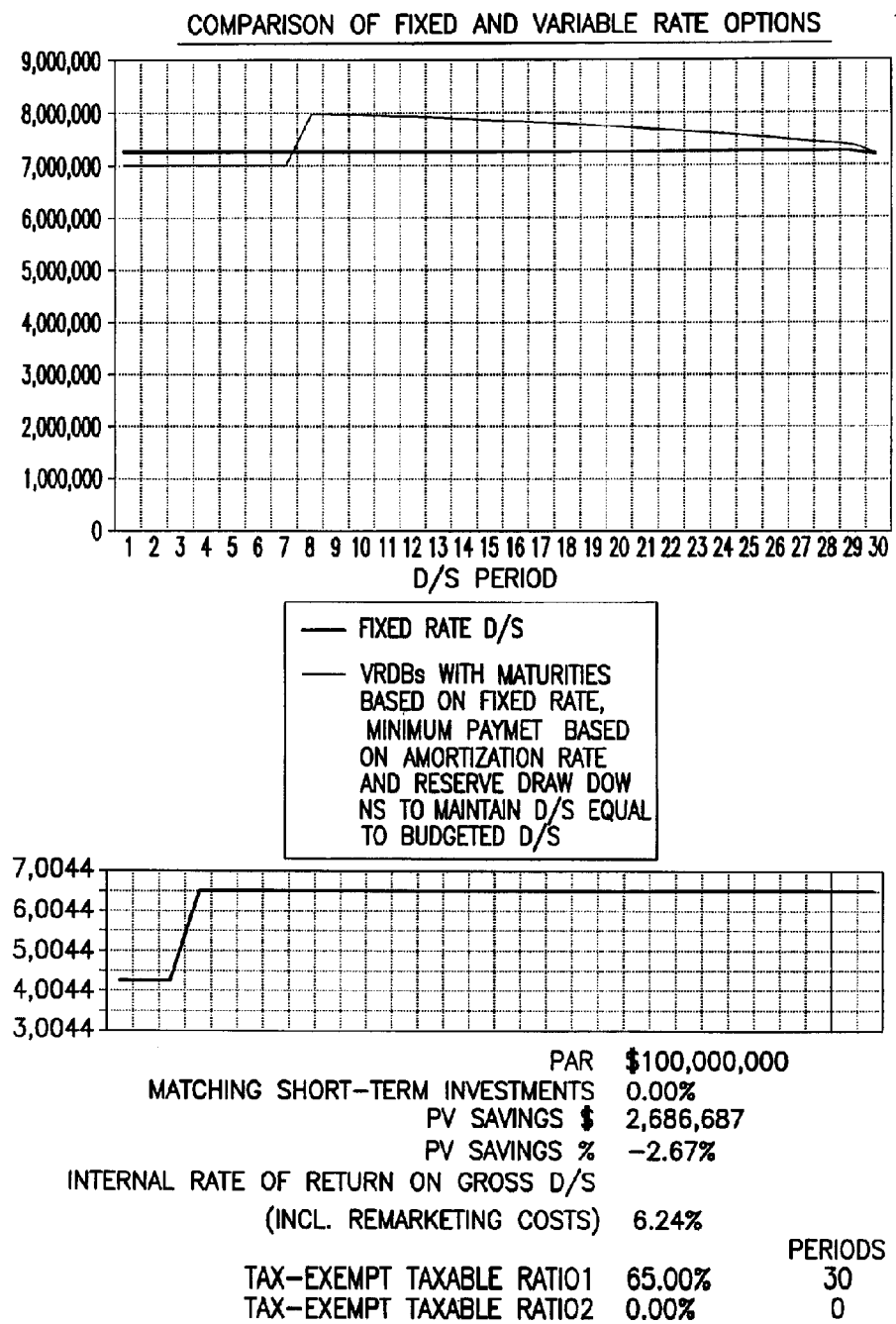
Figures 1, 2, 4I:
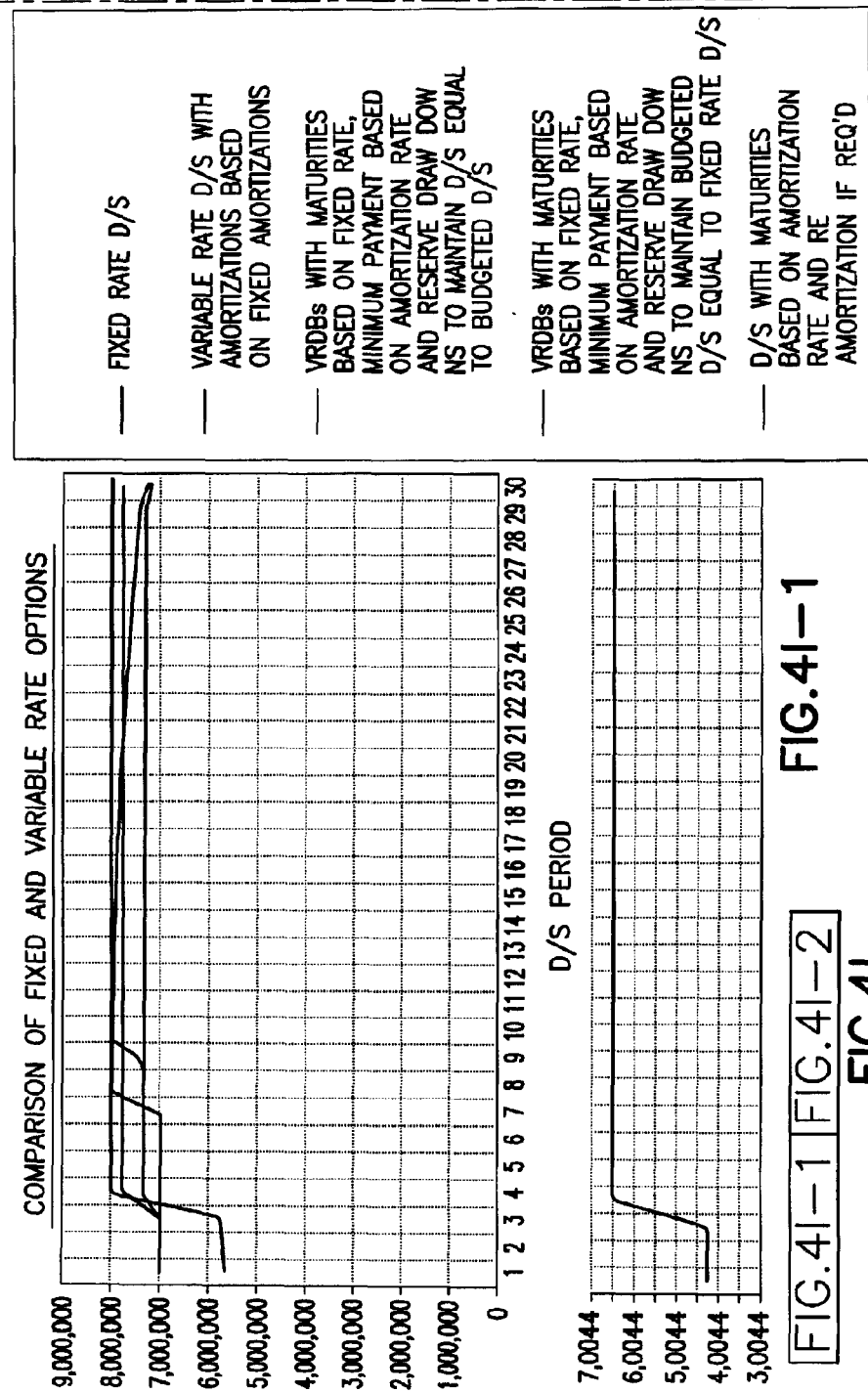
Figure 4K:
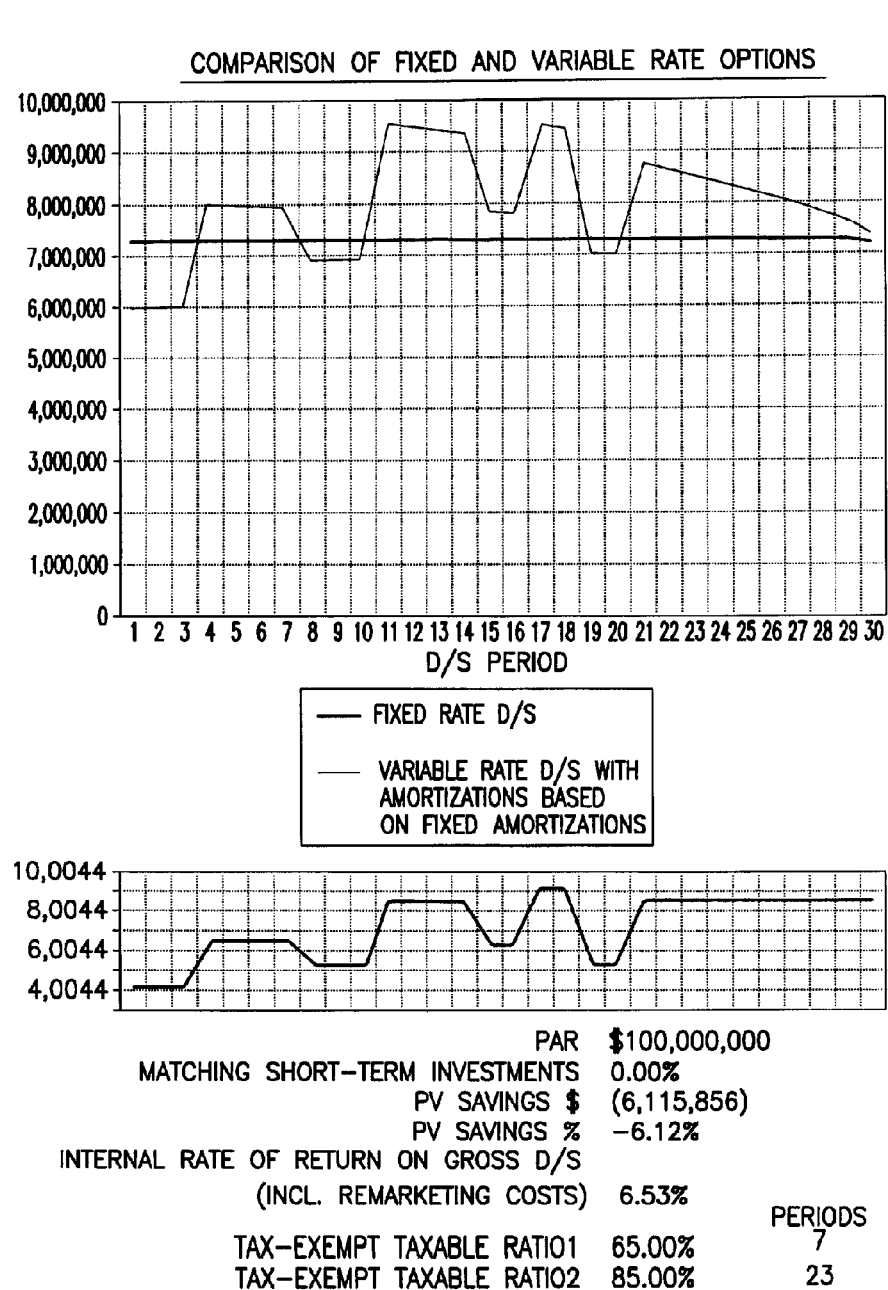
Figure 4L:
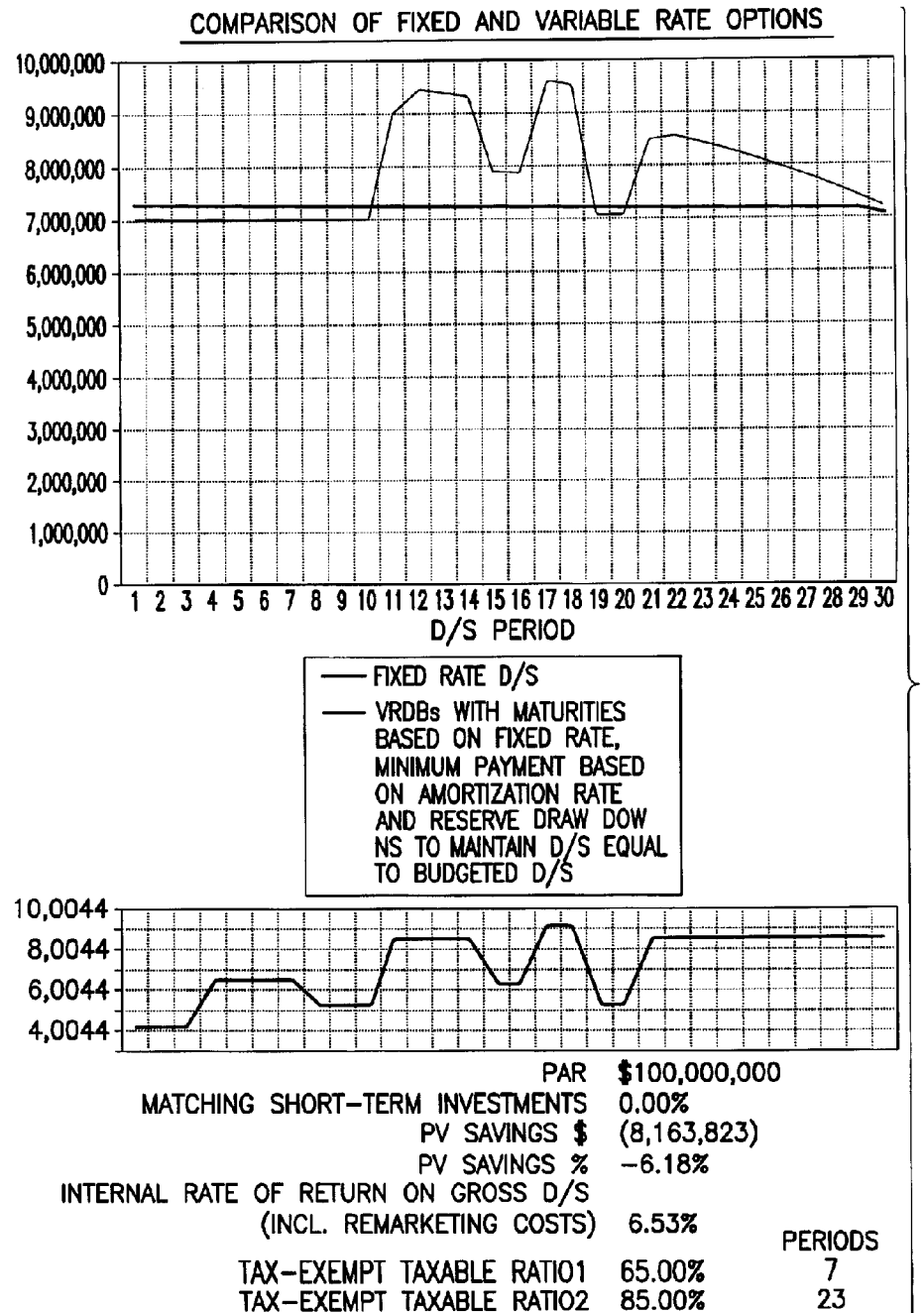
Figure 4M:
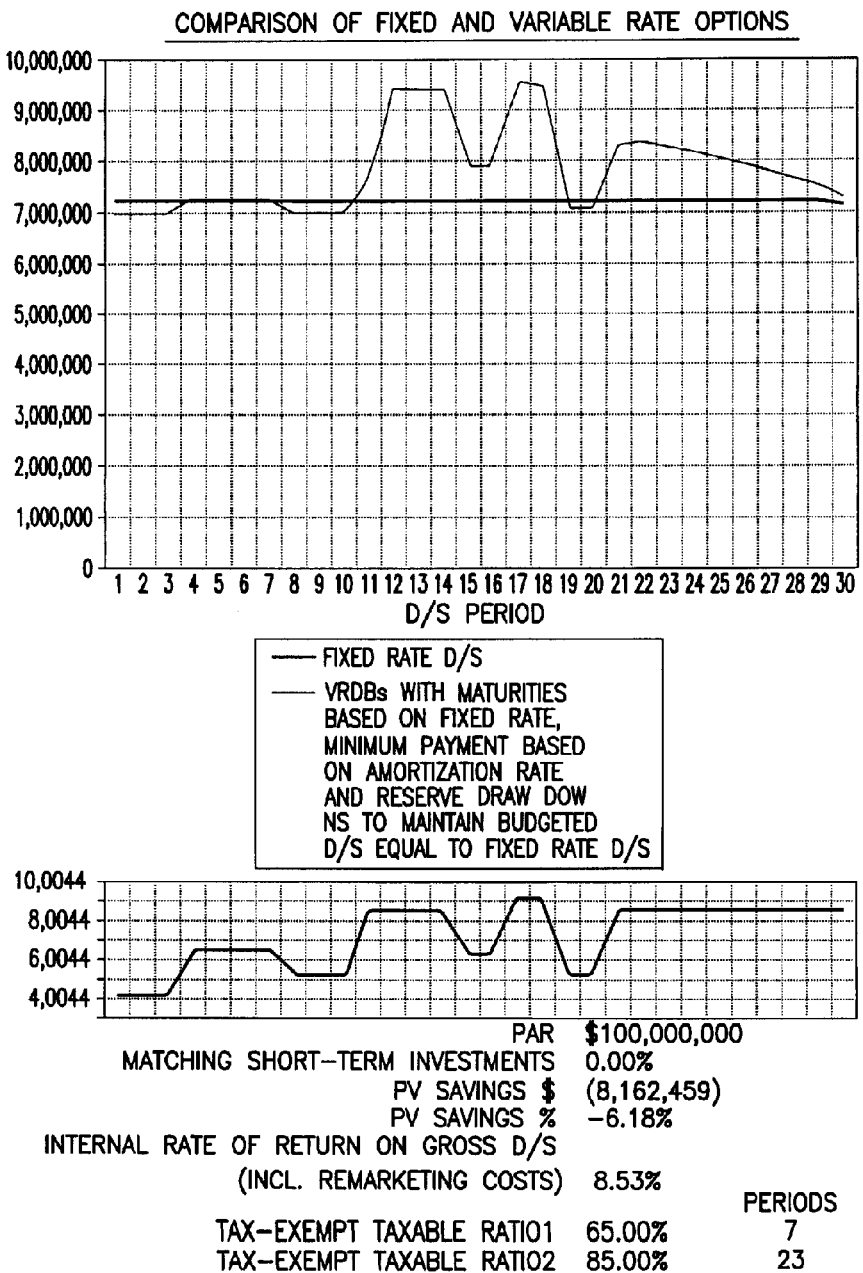
Figure 4N:
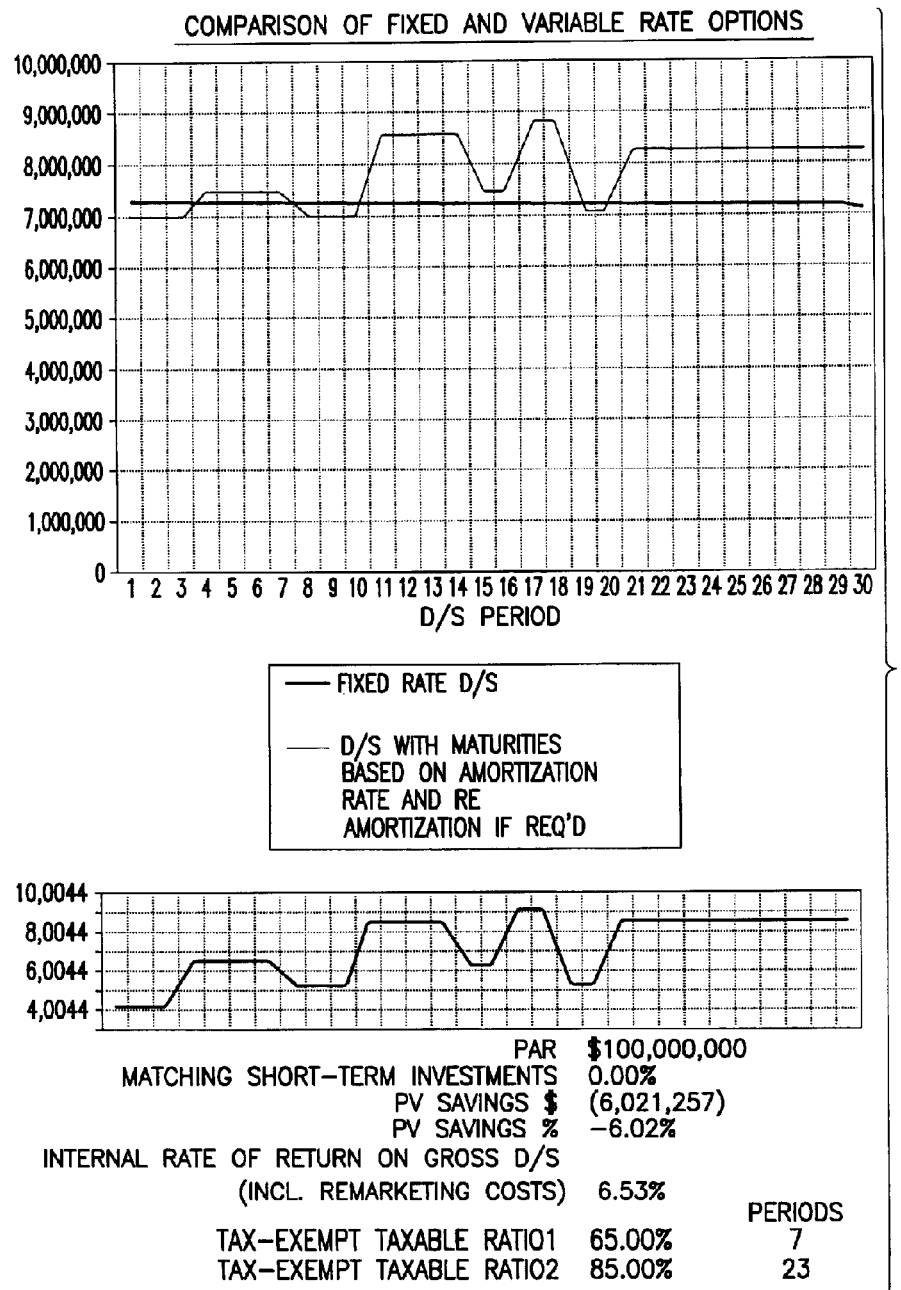
Figure 40:
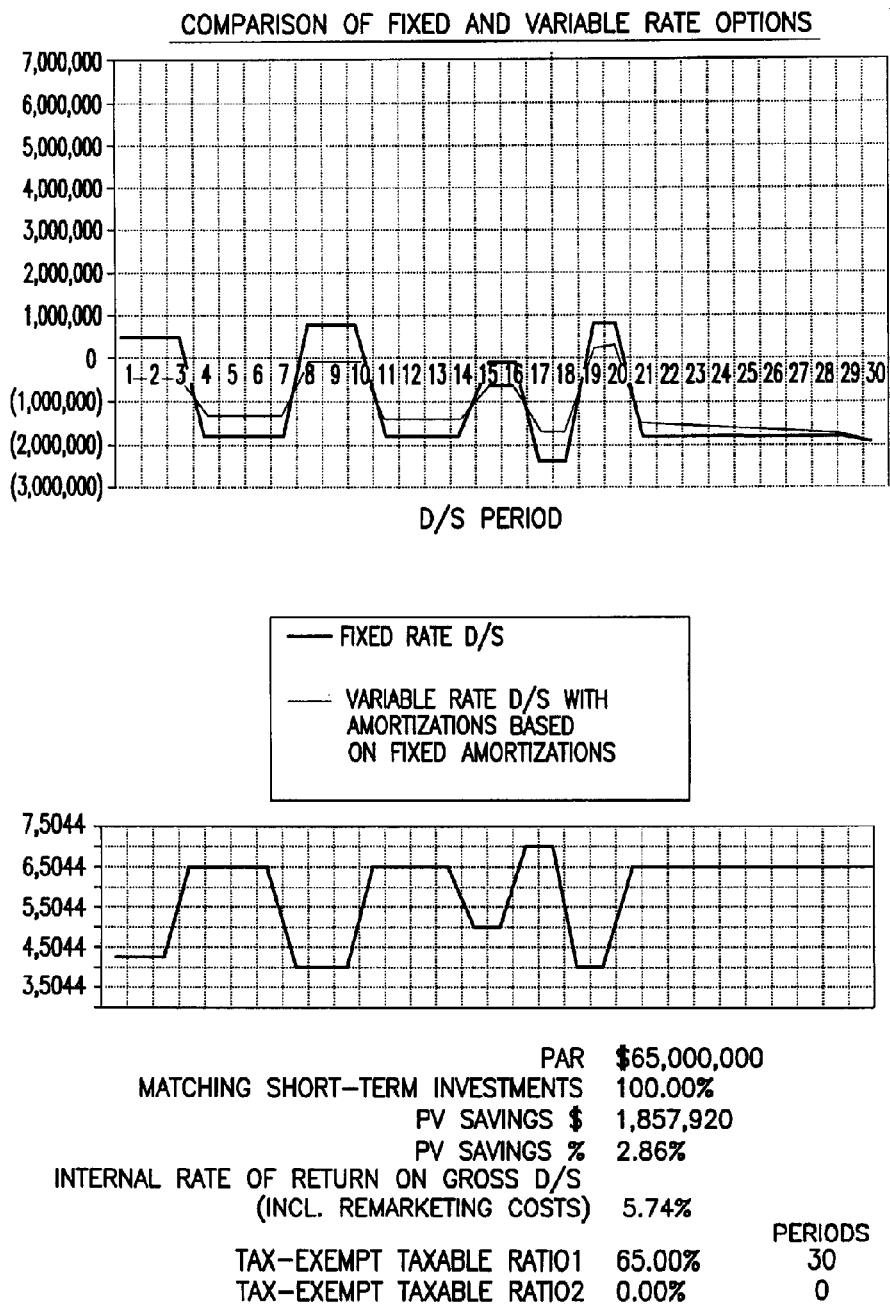
Figure 4P:
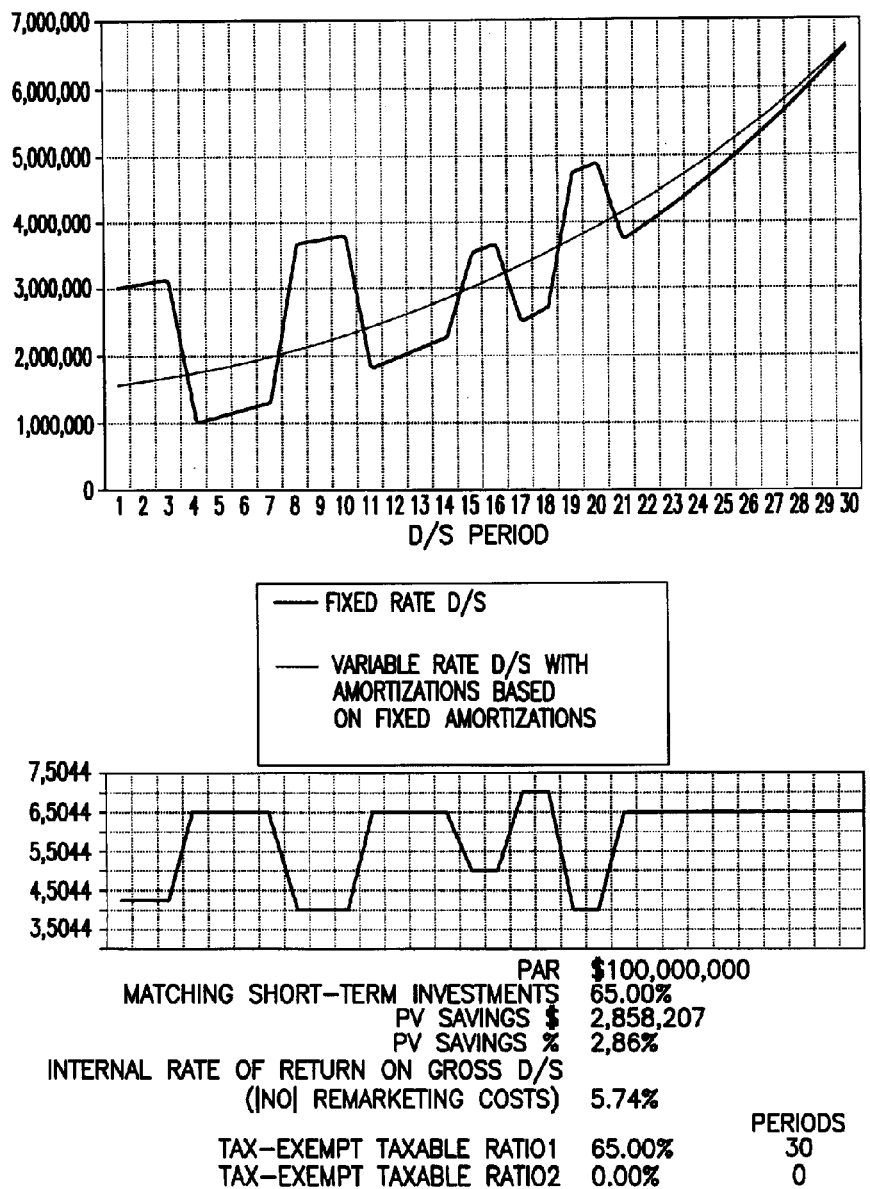
Figure 4S:
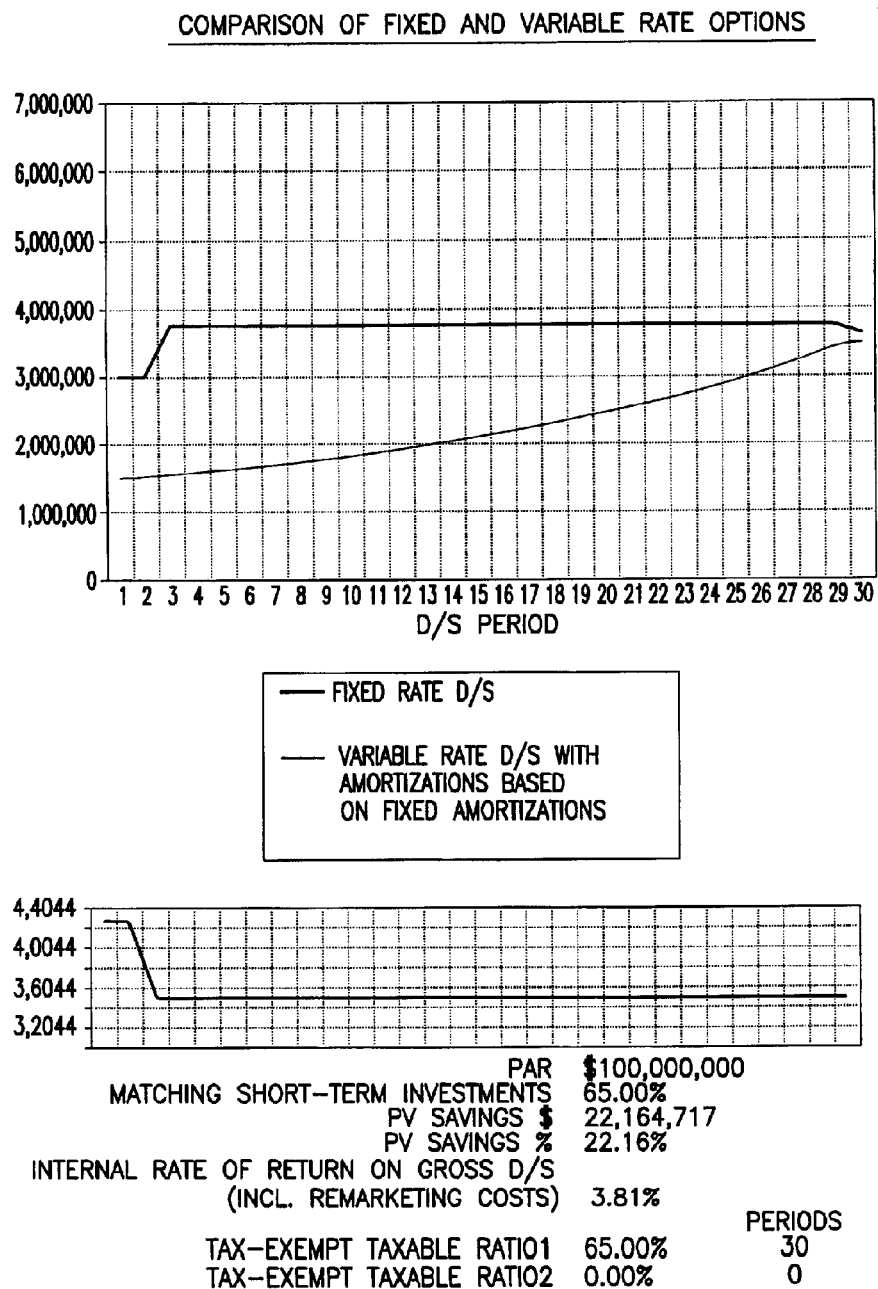
Figure 4T:
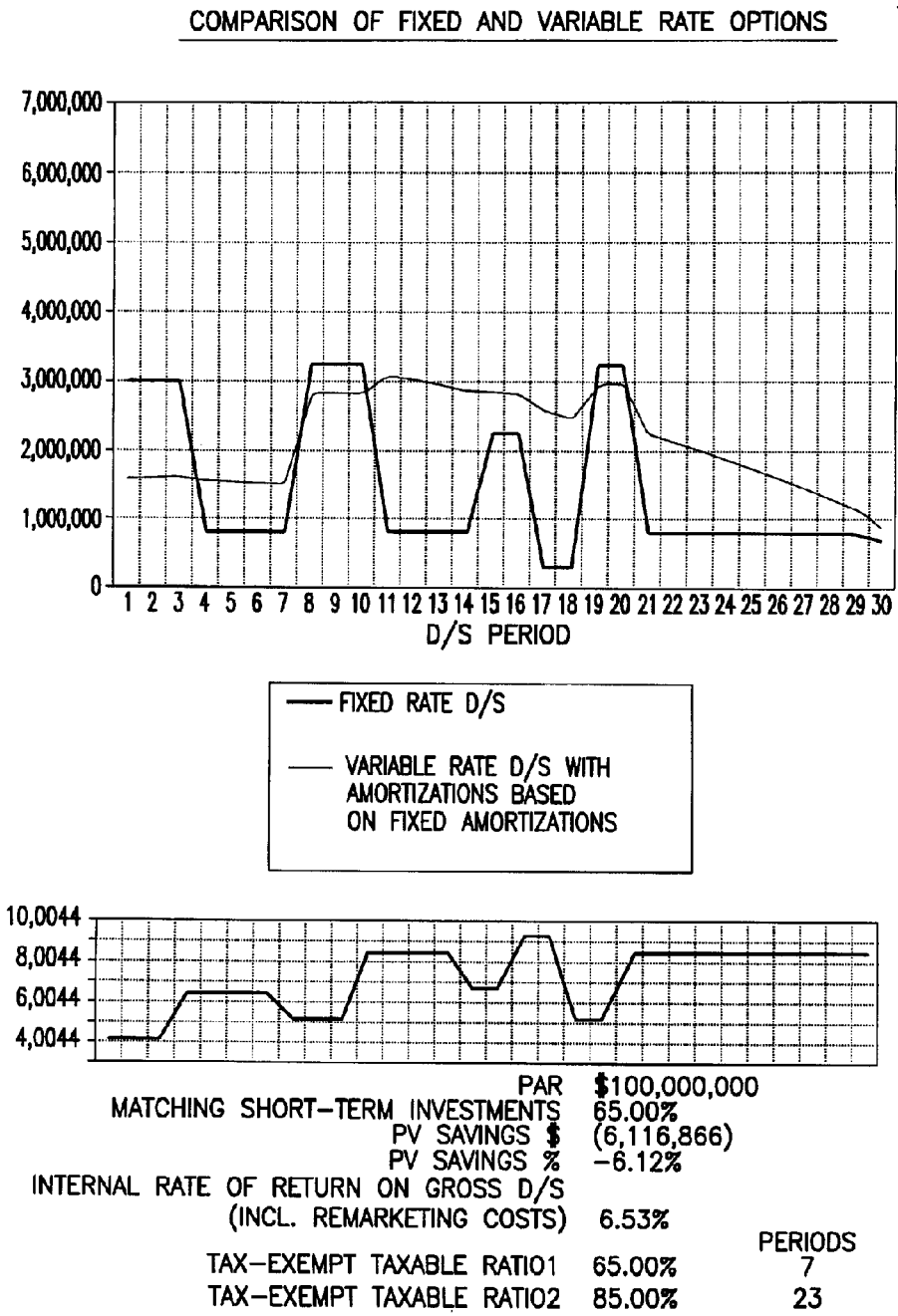

Referring now to FIG. 3, a block diagram of a system according to one embodiment of the present invention is shown. As seen in this Fig., Computer 301 includes Memory 303 for storing a software program (not shown) and CPU 305 for processing the software program. Monitor 307, Keyboard 309, Mouse 311, and Printer 313 are connected to Computer 301 to provide user input/output. Input/output to the software program may also be accomplished via a storage medium (e.g., a hard drive or a CD) and/or a network, each of which is not shown The software program stored in Memory 303 and processed by CPU 305 may of course be one of the software programs of the present invention. In any case, the details of each of Computer 301, Memory 303, CPU 305, Monitor 307, Keyboard 309, Mouse 311, and Printer 313 are well known to those of ordinary skill in the art and will not be discussed further.

In another embodiment of the present invention, the MIRRMP may be applied to aid an issuer in maximizing current savings from the use of variable rate debt while essentially achieving budgetary certainty for a current year. It is noted that this embodiment of the present invention does not necessarily eliminate budgetary volatility from year to year but, rather, essentially gives the issuer certainty that the budgeted amount for a current year will be the actual debt service due.

More particularly, as an alternative to requiring that an issuer budget conservatively (for example, at a higher interest rate than is actually expected) in order to insure that budgeted funds are sufficient, application of the MIRRMP approach according to this embodiment of the present invention makes use of the flexibility to modify the amortization of variable rate debt to essentially provide budgetary certainty for a current year.

One particular example of this embodiment of the present invention (which is intended for illustration only, and is not intended to be restrictive), may operate as follows:

(A) The issuer would be required to budget for the expected amount of interest on its variable rate bonds ("VRDBs"). The determination of the expected amount of interest could be left either partially or entirely to the issuer and/or the expected amount of interest could be required to equal at least some minimum, such as the prior year's interest, for example.

(B) In addition, the issuer would be required to increase or decrease the amount budgeted under (A) for the current year by the amount by which the prior year's actual interest exceeded or was less than the amount budgeted under (A) for the prior year.

(C) The planned principal amortization for the current year would be: i) increased or decreased by the amount by which the actual interest for the current year is less than or greater than the amount budgeted under (A) for the current year; and ii) increased or decreased by the amount increased or decreased under (B) for the current year.

Thus, the amount budgeted for principal and interest would equal the actual principal and interest payable in the current year. However, the allocation between principal and interest could be different than the amount initially reflected in the budget by the difference between the actual interest rate and the rate budgeted under (A).

While a number of embodiments of the present invention have been described, it is understood that these embodiments are illustrative only, and not restrictive, and that many modifications may become apparent to those of ordinary skill in the art. For example, the credit or credits may include one or more bonds. Further, at least one of a) a portion of the current budgetary excess and b) a portion of the accumulated budgetary excess may be applied by the borrower across different credits within a fund of credits. Further still, at least one of a) a portion of the current budgetary excess and b) a portion of the accumulated budgetary excess may applied by the borrower across a series of credits issued at different times. Further still, at least one of a) a portion of the current budgetary excess and b) a portion of the accumulated budgetary excess may be applied by the borrower across a series of credits including both a variable rate credit and a fixed rate credit. Further still, in the event that during any year, budgeted funds for interest and funds set aside for interest mitigation are not sufficient to cover debt service, a Debt Service Reserve Fund ("DSRF") might be made available to fund the excess. Monies could then be budgeted to fund the DSRF deficiency in the succeeding year(s). Also, in the event that the interest rate were to exceed the amortization rate, an alternative approach could be to make the reserve available to delay the point at which the issuer would have to budget in excess of the amortization rate. (This feature may create credit concerns with some rating agencies). Further still, other reserves not typically available to pay debt service (e.g., a renewal and replacement fund intended to be used only for extraordinary repairs) could be similarly used. Further still, the methods described may be carried out via requirements included in one or more legal or financial instruments. Further still, the present invention may be utilized to manage risk (e.g., interest rate risk) in the context of unhedged, and/or imperfectly hedged variable rate and/or fixed rate debt (either "natural" or "synthetic"). Further still, the first predetermined low interest rate level and/or the second predetermined low interest rate level may be equal to or different from the first predetermined high interest rate level and/or the second predetermined high interest rate level. Further still, various interest rates indicated as being below predetermined interest rate levels may, of course, be below or equal to the predetermined interest rate levels. Likewise, various interest rates indicated as being above predetermined interest rate levels may, of course, be above or equal to the predetermined interest rate levels. Further still, the term "current" (used with the phrase "current budgetary excess", for example) may apply to any appropriate current period, such as this year, this month, or this week, for example. Further still, the term "accumulated" (used with the phrase "accumulated budgetary excess", for example) may apply to any accumulation from an appropriate prior period, such as last year, last month, or last week, for example. Further still, the memory of the system may comprise a magnetic hard drive, a magnetic floppy disk, a compact disk, a ROM, a RAM, and/or any other appropriate memory. Further still, the computer of the system may comprise a stand-alone PC-type micro-computer as depicted or the computer may comprise one of a mainframe computer or a mini-computer, for example. Further still, another computer could communicate with the software program and/or computer of the system by utilizing a local area network, a wide area network, or the Internet, for example.

What is claimed is:

1. A processor-implemented method for managing variable rate debt comprising:

receiving, by a processor, information relating to the variable rate debt of a borrower;

determining, by the processor, based on the received information, a budget for interest owed on the variable rate debt to be applied by the borrower during a time period when an interest rate on the variable rate debt is below a first predetermined low interest rate level;

calculating by the processor, a value of at least a portion of any existing current budgetary excess to be applied by the borrower to reduce future interest rate risk by performing at least one of i) the early retirement of principal associated with the variable rate debt and ii) the funding of a sinking fund;

calculating by the processor, a value of at least a portion of any accumulated budgetary excess; and transferring, by the processor, to the borrower, of the calculated value for the borrower to apply during a time period when the interest rate is above a first predetermined high interest rate level to reduce an amount of debt service.

2. The method of claim 1, further comprising the step of extending a principal amortization period associated with the variable rate debt by the borrower to maintain the amount of debt service below a predetermined debt service level during the time period when the interest rate is above a second predetermined high interest rate level and the impact of the performance of at least one of i) the early retirement of principal and ii) the application to principle and interest of amounts available in the sinking fund is not sufficient to avoid an increase in the amount of debt service above the predetermined debt service level, wherein the first predetermined high interest rate level and second predetermined high interest rate level are selected from the group of i) different levels and ii) the same levels.

3. The method of claim 1, further comprising the step of reducing a principal amortization period associated with the variable rate debt by the borrower during the time period when the interest rate is below a second predetermined low interest rate level, wherein the first predetermined low interest rate level and second predetermined low interest rate level are selected from the group of i) different levels and ii) the same levels.

4. The method of claim 1, wherein the existing current budgetary excess includes budgetary excess this year, this quarter, this month, or this week.

5. The method of claim 1, wherein the accumulated budgetary excess includes budgetary excess accumulated last year, last quarter, last month, or last week.

6. A processor-readable medium storing a plurality of processing instructions for managing variable rate debt, comprising issuable instructions by a processor to:

calculate a budget for interest owed on the variable rate debt during a time period when an interest rate on the variable rate debt is below a first predetermined low interest rate level;

calculate a value of at least a portion of any existing current budgetary excess to be applied to reduce future interest rate risk by performing at least one of i) the early retirement of principal associated with the variable rate debt and the funding of a sinking fund; and calculate a value of at least a portion of any accumulated budgetary excess to be applied during a time period when the interest rate is above a first predetermined high interest rate level to reduce an amount of debt service.

7. The processor-readable medium storing a plurality of processing instructions of claim 6, further comprising issuable instructions by a processor to calculate an extension to a principal amortization period associated with the variable rate debt to maintain the amount of debt service below a predetermined debt service level during the time period when the interest rate is above a second predetermined high interest rate level and the impact of the performance of at least one of i) the early retirement of principal and ii) the application to principle and interest of amounts available in the sinking fund is not sufficient to avoid an increase in the amount of debt service above the predetermined debt service level, wherein the first predetermined high interest rate level and second predetermined high interest rate level are selected from the group of i) different levels and ii) the same levels.

8. A system for managing variable rate debt comprising:
a memory; and
a processor disposed in communication with said memory, and configured to issue a plurality of processing instructions stored in the memory, wherein the processor issues instructions to:

calculate a budget for interest owed on the variable rate debt during a time period when an interest rate on the variable rate debt is below a first predetermined low interest rate level;

calculate a value of at least a portion of any existing current budgetary excess to be applied to reduce future interest rate risk by performing at least one of i) the early retirement of principal associated with the variable rate debt and ii) the funding of a sinking fund; and calculate a value of at least a portion of any accumulated budgetary excess to be applied during a time period when the interest rate is above a first predetermined high interest rate level to reduce an amount of debt service.

9. The system of claim 8, wherein the software program further comprises principal amortization extension calculation means for calculating an extension to a principal amortization period associated with the variable rate debt to maintain the amount of debt service below a predetermined debt service level during the time period when the interest rate is above a second predetermined high interest rate level and the impact of the performance of at least one of i) the early retirement of principal and ii) the application to principle and interest of amounts available in the sinking fund is not sufficient to avoid an increase in the amount of debt service above the predetermined debt service level, wherein the first predetermined high interest rate level and second predetermined high interest rate level are selected from the group of i) different levels and ii) the same levels.

10. A processor-implemented method for managing debt created by an issuer using an interest rate swap in which the issuer makes a fixed rate payment and receives a variable rate payment that at least partially offsets an interest payment on a variable rate bond issued by the issuer comprising:

receiving by a processor, information relating to the variable rate debt of a borrower;

determining by the processor, a budget amount by the issuer to cover the fixed rate payment, wherein the budgeted amount is higher than the amount of the fixed rate payment;

calculating by the processor, a value of at least a portion of any current budgetary excess by the issuer resulting from the receipt of the variable rate payment at a level that produces a payment higher than the interest payment on the variable rate bond to perform at least one of i) the early retirement of principal associated with the synthetic fixed rate debt and ii) the funding of a sinking fund; and calculating by the processor, a value of at least a portion of any funds in the sinking fund to be applied to the interest payment on the variable rate bond if the interest payment on the variable rate bond increases above a predetermined high interest rate level to reduce an amount of debt services associated with the variable rate bond.

11. The method of claim 10, further comprising the step of extending a principal amortization period by the issuer associated with the variable rate bond when the variable rate payment received by the issuer is less than the interest payment on the variable rate bond.

12. The method of claim 10, further comprising, reducing a principal amortization period associated with the variable rate bond when the variable rate payment received by the issuer exceeds the interest payment on the variable rate bond.

13. A processor-implemented method for managing variable rate debt comprising:

receiving, by a processor, information relating to the variable rate debt of a borrower;

executing, by the processor, a first requirement from a plurality of requirements included in at least one legal or financial instrument associated with the variable rate debt, the first requirement requiring the borrower to budget for interest owed on the variable rate debt during a time period when an interest rate on the variable rate debt is below a first predetermined low interest rate level to produce a current budgetary excess;

executing, by the processor, a second requirement from the plurality of requirements, the second requirement requiring the borrower to apply at least a portion of a current budgetary excess to reduce future interest rate risk by performing at least one of i) the early retirement of principal associated with the variable rate debt and the funding of a sinking fund; and executing, by the processor, a third requirement from the plurality of requirements, the third requirement requiring the borrower to apply at least a portion of any accumulated budgetary excess during a time period when the interest rate is above a first predetermined high interest rate level to reduce an amount of debt service associated with the variable rate debt.

14. The method of claim 13, further comprising executing a requirement from the plurality of requirements that at least a portion of any accumulated funds in the sinking fund be applied by the borrower during the time period when the interest rate is above the first predetermined high interest rate level to reduce the amount of debt service associated with the variable rate debt.

15. A processor-implemented method for managing variable rate debt comprising:

receiving, by a processor, information relating to the variable rate debt of a borrower;

determining, by the processor, based on the received information, a budget for interest owed on the variable rate debt to be applied by the borrower during a time period when an interest rate on the variable rate debt is below a first predetermined low interest rate level;

calculating by the processor, a value of at least a portion of any existing current budgetary excess to be applied by the borrower to reduce future interest rate risk by performing at least one of i) the early retirement of principal associated with the variable rate debt and ii) the funding of a sinking fund;

calculating by the processor, a value of at least a portion of any accumulated budgetary excess;

extending a principal amortization period associated with the variable rate debt by the borrower to maintain the amount of debt service below a predetermined debt service level during the time period when the interest rate is above a second predetermined high interest rate level and the impact of the performance of at least one of i) the early retirement of principal and ii) the application to principle and interest of amounts available in the sinking fund is not sufficient to avoid an increase in the amount of debt service above the predetermined debt service level, wherein the first predetermined high interest rate level and second predetermined high interest rate level are selected from the group of i) different levels and ii) the same levels;

reducing a principal amortization period associated with the variable rate debt by the borrower during the time period when the interest rate is below a second predetermined low interest rate level, wherein the first predetermined low interest rate level and second predetermined low interest rate level are selected from the group of i) different levels and ii) the same levels; and transferring, by the processor, to the borrower, of the calculated value for the borrower to apply during a time period when the interest rate is above a first predetermined high interest rate level to reduce an amount of debt service.

* * * * *

UNITED STATES PATENT AND TRADEMARK OFFICE
CERTIFICATE OF CORRECTION

| | | |
|---|---|---|
| PATENT NO. | : 8,266,034 B1 | Page 1 of 1 |
| APPLICATION NO. | : 12/119227 | |
| DATED | : September 11, 2012 | |
| INVENTOR(S) | : George H. Butcher | |

It is certified that error appears in the above-identified patent and that said Letters Patent is hereby corrected as shown below:

In the Claims

Column 15, claim 1, line 6, delete "of"

Column 16, claim 10, line 45, delete "receiving" and insert --receiving,--

Column 16, claim 10, line 47, delete "determining" and insert --determining,--

Column 18, claim 15, line 37, delete "of"

Signed and Sealed this
Twenty-ninth Day of July, 2014

Michelle K. Lee
*Deputy Director of the United States Patent and Trademark Office*